(12) United States Patent
Hunter

(10) Patent No.: US 10,646,883 B2
(45) Date of Patent: May 12, 2020

(54) CONTAMINATION TRAP

(71) Applicant: RENISHAW PLC, Wotton-Under-Edge, Gloucestershire (GB)

(72) Inventor: Stephen Paul Hunter, Chipping Sodbury (GB)

(73) Assignee: RENISHAW PLC, Wotton-under-Edge (GB)

( * ) Notice: Subject to any disclaimer, the term of this patent is extended or adjusted under 35 U.S.C. 154(b) by 214 days.

(21) Appl. No.: 15/955,120

(22) Filed: Apr. 17, 2018

(65) Prior Publication Data

US 2018/0304276 A1 Oct. 25, 2018

(30) Foreign Application Priority Data

Apr. 19, 2017 (EP) .................................... 17275053

(51) Int. Cl.
| | | |
|---|---|---|
| *G01B 5/008* | (2006.01) | |
| *B03C 1/30* | (2006.01) | |
| *G01B 5/00* | (2006.01) | |
| *G01B 21/04* | (2006.01) | |

(52) U.S. Cl.
CPC .............. *B03C 1/30* (2013.01); *G01B 5/0004* (2013.01); *G01B 5/008* (2013.01); *G01B 21/04* (2013.01)

(58) Field of Classification Search
CPC .................................. B03C 1/30; G01B 5/008
USPC .......................................................... 33/503
See application file for complete search history.

(56) References Cited

U.S. PATENT DOCUMENTS

| | | | |
|---|---|---|---|
| 2,516,020 | A | 7/1950 | Reed |
| 2,789,480 | A | 4/1957 | Wellauer |
| 3,749,501 | A | 7/1973 | Wieg |
| 3,831,283 | A | 8/1974 | Pagella et al. |
| 4,138,822 | A | 2/1979 | Parodi et al. |
| 4,651,439 | A | 3/1987 | Band et al. |
| 4,680,868 | A | 7/1987 | Orr et al. |
| 4,882,847 | A | 11/1989 | Hemmelgarn et al. |
| 4,964,220 | A | 10/1990 | Orr et al. |

(Continued)

FOREIGN PATENT DOCUMENTS

| | | |
|---|---|---|
| CN | 2627338 Y | 7/2004 |
| CN | 101563510 B | 9/2014 |

(Continued)

OTHER PUBLICATIONS

Oct. 27, 2017 Search Report issued in European Patent Application No. 17275054.9.

(Continued)

*Primary Examiner* — George B Bennett
(74) *Attorney, Agent, or Firm* — Oliff PLC

(57) ABSTRACT

A coordinate positioning apparatus for inspecting an artefact. The coordinate positioning apparatus includes at least one moveable member moveable in at least one degree of freedom, and at least one motor and at least one bearing arrangement for facilitating said movement. At least a part of the at least one motor and/or at least one bearing arrangement are located inside a protective housing therefor. A ferromagnetic contamination trap comprising at least one magnet is provided and configured to attract and retain ferromagnetic contamination entering the protective housing.

15 Claims, 22 Drawing Sheets

(56) References Cited

U.S. PATENT DOCUMENTS

| | | | |
|---|---|---|---|
| 5,063,683 A | 11/1991 | Bury | |
| 5,094,549 A | 3/1992 | Lyon | |
| 5,125,163 A | 6/1992 | Bury | |
| 5,173,613 A | 12/1992 | Henry et al. | |
| 5,247,749 A | 9/1993 | Bury | |
| 5,287,629 A | 2/1994 | Pettersson | |
| 5,388,342 A | 2/1995 | Garau et al. | |
| 5,388,343 A | 2/1995 | Garau et al. | |
| 5,402,981 A | 4/1995 | McMurtry | |
| 5,505,004 A | 4/1996 | Pettersson | |
| 5,621,978 A | 4/1997 | Sarauer | |
| 5,758,429 A | 6/1998 | Farzan et al. | |
| 5,832,416 A | 11/1998 | Anderson | |
| 5,848,480 A | 12/1998 | Sola et al. | |
| 6,050,048 A | 4/2000 | Hellsten | |
| 6,058,618 A | 5/2000 | Hemmelgarn et al. | |
| 6,161,298 A | 12/2000 | Bernhardt et al. | |
| 6,202,316 B1 | 3/2001 | Swift et al. | |
| 6,834,471 B2 | 12/2004 | Takagi et al. | |
| 7,191,541 B1 | 3/2007 | Weekers et al. | |
| 7,533,574 B2 | 5/2009 | McMurtry et al. | |
| 8,739,420 B2 | 6/2014 | Tarizzo | |
| 9,109,747 B2 | 8/2015 | Schernthaner | |
| 2003/0037451 A1 | 2/2003 | Sarauer | |
| 2003/0218457 A1 | 11/2003 | Aiba et al. | |
| 2004/0250434 A1 | 12/2004 | Ogura et al. | |
| 2004/0250503 A1 | 12/2004 | Bigelow | |
| 2005/0097766 A1 | 5/2005 | Weekers et al. | |
| 2007/0040453 A1 | 2/2007 | Aoki et al. | |
| 2007/0220767 A1 | 9/2007 | Pettersson | |
| 2010/0018153 A1 | 1/2010 | Garau | |
| 2011/0083497 A1* | 4/2011 | Matsumiya | G01B 5/008 73/105 |
| 2012/0041712 A1 | 2/2012 | Pettersson | |
| 2015/0028699 A1 | 1/2015 | Hofstetter et al. | |
| 2015/0292852 A1* | 10/2015 | Oki | G01B 21/042 33/502 |
| 2016/0349034 A1* | 12/2016 | Cobb | G01B 5/008 |
| 2017/0176164 A1* | 6/2017 | Seitz | G01B 5/008 |
| 2017/0322016 A1* | 11/2017 | Kanno | G01B 5/008 |
| 2018/0195851 A1* | 7/2018 | Sakamoto | G01B 5/008 |
| 2018/0306570 A1* | 10/2018 | Angood | G01B 5/004 |
| 2018/0309354 A1* | 10/2018 | Angood | G01B 5/008 |
| 2019/0145764 A1* | 5/2019 | Atherton | G01B 5/008 33/503 |
| 2020/0001305 A1* | 1/2020 | Schiffers | B03C 1/30 |

FOREIGN PATENT DOCUMENTS

| | | |
|---|---|---|
| DE | 3107783 A1 | 9/1982 |
| DE | 3927525 C2 | 2/1991 |
| DE | 4132655 A1 | 4/1993 |
| DE | 4325337 A1 | 2/1994 |
| DE | 4345094 A1 | 7/1995 |
| DE | 29705152 U1 | 7/1997 |
| DE | 10055188 A1 | 5/2002 |
| DE | 10215188 A1 | 10/2003 |
| DE | 102004047525 A1 | 4/2006 |
| DE | 102006027898 B3 | 7/2007 |
| DE | 102016101695 A1 | 8/2016 |
| EP | 0268659 A1 | 6/1988 |
| EP | 0589565 A2 | 3/1994 |
| EP | 0957332 A2 | 11/1999 |
| EP | 1463185 A2 | 9/2004 |
| EP | 1854577 B1 | 11/2007 |
| EP | 2089592 B1 | 8/2009 |
| EP | 1500903 B9 | 5/2012 |
| FR | 1397480 A | 4/1965 |
| GB | 2095143 A | 9/1982 |
| GB | 2262319 B | 3/1995 |
| JP | S61/90850 A | 5/1986 |
| JP | H05/312556 A | 11/1993 |
| JP | H08-114442 A | 5/1996 |
| JP | 2003/309963 A | 10/2003 |
| SU | 1167413 A1 | 7/1985 |
| WO | 89/09677 A1 | 10/1989 |
| WO | 89/09887 A1 | 10/1989 |
| WO | 91/03145 A1 | 3/1991 |
| WO | 2005/043552 A1 | 5/2005 |
| WO | 2007/093789 A1 | 8/2007 |
| WO | 2007/128431 | 11/2007 |
| WO | 2007/144906 A1 | 12/2007 |
| WO | 2010/106079 A1 | 9/2010 |

OTHER PUBLICATIONS

Sep. 6, 2018 Extended Search Report issued in European Patent Application No. 18167645.3.
Oct. 6, 2017 Search Report issued in European Patent Application No. 17275053.1.
May 25, 2018 Search Report issued in European Patent Application No. 18167707.1.
Nov. 29, 2017 Search Report issued in European Patent Application No. 17275114.1.
Oct. 4, 2017 Search Report issued in European Patent Application No. 17275052.3.
May 25, 2018 Search Report issued in International Patent Application No. PCT/GB2018/050996.
"Linear Ball Bushings"; Automotion Components brochure; automotioncomponents.co.uk; pp. 544-609.
Thomson; "Thomson RoundWay Linear Roller Bearings"; Thomson brochure; www.thompsonlinear.com; pp. 1-6.
Thomson; "RoundWay Roller Bearings"; Thomson web page; http://www.thomsonlinear.com/website/com/eng/products/linear_guides/linear_specialty; [retreived Sep. 5, 2014].
Connelly, R; "The basics of rigidity: Lectures I and II, Session on Granlular Matter Institut Henri Poincaré"; Cornell University; http://www.math.cornell.edu/~connelly/BasicsI.BasicsII.pdf.
Ziegert, John; "Design and Testing of a High Speed, 5-DOF, Coordinate Measuring Machine with Parallel Kinematic Structure"; University of Florida; pp. 1-4.
"I-beam"; Wikipedia article; pp. 1-5; https://en.wikipedia.org/wiki/I-beam; accessed Jan. 24, 2019.
"Revolution CMM Models"; Advanced Industrial Measurement Systems; pp. 1-10; http://aimsmetrology.com/revolution-cmm-models/; webpage from Apr. 18, 2016; [retrieved Jan. 31, 2019].
Renishaw plc; "Equator 300 gaging system"; Renishaw datasheet H-5504-8200-01; www.renishaw.com; 2010.
Renishaw plc; "Equator versatile gauge with MODUS software"; Renishaw brochure H-5504-8200-07-A; www.renishaw.com; 2015.

* cited by examiner

CONTAMINATION TRAP

This invention relates to a coordinate positioning apparatus, for example a coordinate measuring machine (CMM).

A coordinate positioning apparatus comprises a plurality of moveable members for effecting relative movement of a tool and an artefact (to be inspected/worked on). For example, a Cartesian coordinate positioning apparatus typically comprises a movement system comprising three linear axes that are arranged in series, and arranged generally mutually perpendicular to each other (and generally designated as an x, y and z axis). Typical Cartesian coordinate positioning apparatus include Bridge, Cantilever, Horizontal Arm, and Gantry type machines.

As will be understood, coordinate positioning apparatus can have one or more protective housings (also known in the field of CMMs as "covers", e.g. main covers or hard covers), inside of which one or more components are located so as to protect them from contamination and/or from physical objects. For example, bearing members and/or drive devices (e.g. motors) can be located inside the protective housings/covers such that they are offered at least some form of protection from external physical objects and/or contamination. A protective housing which contains the bearing members and/or drive devices could be referred to as a bearingway or guideway housing, or cover. Any openings (e.g. elongate openings which facilitate relatively moveable members to cooperate with and move relative to each other) can be provided with one or more seals and/or compliant covers. Such seals and compliant covers are commonly referred to in the field as dust seals or dust covers, and examples include labyrinth seals and retractable covers (such as bellows and roller blinds) which expand and collapse/fold with movement of the relatively moveable members.

The present invention relates to an improved coordinate positioning apparatus. In particular, the present invention relates to a coordinate measuring machine with improved contamination protection.

This application describes a coordinate positioning apparatus (in particular a coordinate measuring machine) for inspecting an artefact, comprising relatively moveable members (for effecting relative movement of an inspection device and a workpiece in at least one degree of freedom) and at least one motor and at least one bearing arrangement for facilitating said movement of said relatively moveable members. At least a part of the at least one motor and/or at least one bearing arrangement can be located inside a protective housing/cover (e.g. main cover or hard cover) therefor. The protective housing/cover can define an "enclosed space" or "internal volume". A ferromagnetic contamination trap comprising at least one magnet can be provided and configured to attract and retain ferromagnetic contamination entering the protective housing/cover (e.g. entering the enclosed space/internal volume defined by the protective housing). According to a first aspect of the invention there is provided a coordinate measuring machine for inspecting an artefact, comprising at least one moveable member for effecting relative movement of an inspection device and a workpiece in at least one degree of freedom, and at least one motor and at least one bearing arrangement for facilitating said relative movement, at least a part of the at least one motor and/or at least one bearing arrangement being located inside a protective housing/cover therefor. A ferromagnetic contamination trap comprising at least one magnet can be provided and configured to attract and retain ferromagnetic contamination entering the protective housing/cover.

The provision of a ferromagnetic contamination trap can help improve the efficiency, and increase the longevity and/or service intervals of the apparatus. This can especially be the case in embodiments in which the apparatus comprises a motor with (e.g. exposed) magnets which would attract ferrous debris.

As will be understood, the protective housing/cover could comprise at least a part of the main structure of the coordinate positioning apparatus; for example the load bearing structure and/or a part of the apparatus that is part of the metrology loop of the coordinate positioning apparatus. Optionally, the protective housing could be a supplemental part to the main structure coordinate positioning apparatus. For example, the protective housing could be a non-structural part of the coordinate positioning apparatus (e.g. they do not carry the pre-load or weight of another member of the coordinate positioning apparatus). Optionally, the protective housing is not a part of the metrology loop of the coordinate positioning apparatus.

Accordingly, a protective housing/cover can be arranged over at least a part of the main load bearing structure of the apparatus. The protective housing/cover can enclose and protect one or more components of the apparatus, such as the bearings, motors and/or structural components of the apparatus. As will be understood, the protective housing/cover could extend along the at least one degree of freedom. For example, the protective housing/cover could be elongate. As explained in more detail below, a protective housing/cover can comprise one or more fixed/stationary members, and one or more compliant members (e.g. deformable or moveable members) such as bellows or blinds which move with a moveable part of the coordinate positioning apparatus.

As will be understood, the inside of the coordinate positioning apparatus also be referred to as the internal volume of the coordinate positioning apparatus. As will be understood, the inside/internal volume is distinct from the ambient operating environment of the coordinate positioning apparatus. Accordingly, as will be understood, in traditional CMM configurations such as a Bridge, Cantilever, Horizontal Arm, and Gantry type machines, the ambient operating environment includes the CMM's inspection region/volume in which artefact to be inspected can be placed.

As will be understood, the coordinate positioning apparatus could comprise a plurality of discrete enclosed volumes. For example, example, the coordinate positioning apparatus could comprise one or more protective housings/cover which divide the inside of the coordinate positioning apparatus into a plurality of enclosed/internal volumes. For example, the coordinate positioning apparatus could comprise a plurality of moveable members for facilitating movement of an inspection device carrying part of the coordinate positioning apparatus in a plurality of axes of motion, for example two or three orthogonal axes (e.g. in the case of a Cartesian CMM). Each axis of motion could comprise a motor and/or bearing arrangement, and a protective housing/cover therefor. Accordingly, there could be provided separate protective housings/covers for each axis of motion.

The relatively moveable members could be moveable in a linear degree of freedom.

The at least one magnet could be configured to move with the relatively moveable member (e.g. it could be retained/provided by/on the moveable member). Optionally, the at least one magnet could be retained/provided by/on the other member. Optionally, at least one magnet could retained/provided by/on the moveable member and at least one magnet could be retained/provided by/on the other member. The at least one magnet could be retained/provided on the same member (of the coordinate measuring machine) on which the protective housing/cover is provided, or on the other member. As described in more detail below, the at least one magnet could be retained/provided by/on (or in) the protective housing/cover.

Optionally, the coordinate positioning apparatus comprises first and second members, moveable relative to each other in a first (e.g. linear) degree of freedom. Optionally, the first member is configured to be stationary (e.g. relative to an artefact to be inspected) and the second member is configured to move along the first member in first (e.g. linear) degree of freedom (accordingly, the second member can be mounted to/on the first member). Optionally said relative movement in a first degree of freedom is facilitated by at least one first motor and at least one first bearing arrangement. Optionally at least a part of the at least one first motor and/or at least one first bearing arrangement are located inside a (first) protective housing/cover therefor. Optionally, a ferromagnetic contamination trap comprising at least one magnet is provided and configured to attract and retain ferromagnetic contamination entering the (first) protective housing/cover. Optionally, the at least one first protective housing/cover is provided by the first member. Optionally, a stator of the first motor is provided by (e.g. fixed relative to) the first member. Optionally a first bearing track (e.g. for an air bearing) is provided by (e.g. fixed relative to) the first member. Optionally at least a part of the stator and/or bearing track is located within the (first) protective housing/cover (and, for example, fixed relative thereto).

Optionally, the coordinate positioning apparatus comprises a third member moveable relative to (e.g. along) the second member in a second (e.g. linear) degree of freedom (accordingly, the second member can be mounted to/on the first member). Optionally, the second degree of freedom is orthogonal to the first degree of freedom. Optionally said relative movement in a second degree of freedom is facilitated by at least one second motor and at least one second bearing arrangement. Optionally at least a part of the at least one second motor and/or at least one second bearing arrangement are located inside a (second) protective housing/cover therefor. Optionally, a ferromagnetic contamination trap comprising at least one magnet is provided and configured to attract and retain ferromagnetic contamination entering the (second) protective housing/cover. Optionally, the at least one (second) protective housing/cover is provided by the second member. Optionally, a stator of the second motor is provided by (e.g. fixed relative to) the second member. Optionally a second bearing track (e.g. for an air bearing) is provided by (e.g. fixed relative to) the second member. Optionally at least a part of the stator and/or bearing track is located within the (second) protective housing/cover (and, for example, fixed relative thereto).

Optionally, the coordinate positioning apparatus comprises a fourth member moveable relative to (e.g. along) the third member in a third (e.g. linear) degree of freedom. Optionally said relative movement in the third degree of freedom is facilitated by at least one third motor and at least one third bearing arrangement. Optionally at least a part of the at least one third motor and/or at least one third bearing arrangement are located inside a (third) protective housing/cover therefor. Optionally, the third degree of freedom is orthogonal to the first and second degrees of freedom. Optionally, a ferromagnetic contamination trap comprising at least one magnet is provided and configured to attract and retain ferromagnetic contamination entering the (third) protective housing/cover. Optionally, the at least one (third) protective housing/cover is provided by the third member.

Optionally, a stator of the third motor is provided by (e.g. fixed relative to) the third member. Optionally a third bearing track (e.g. for an air bearing) is provided by (e.g. fixed relative to) the third member. Optionally at least a part of the stator and/or bearing track is located within the (third) protective housing/cover (and, for example, fixed relative thereto).

Optionally, one of the members is configured to carry a tool for interacting with an artefact, for example an inspection device for inspecting an artefact. The tool could comprise a measurement device, for example a measurement probe. The inspection device could comprise a contact or non-contact inspection device. For example, the inspection device could comprise a scanning probe (also known as an analogue probe). An articulated head could be provided between said member and the tool. The articulated head could be configured to provide rotation of a tool mounted thereon about at least one axis, for example about at least two axes (e.g. at least two orthogonal axes). The articulated head could be a (continuous) scanning head (as opposed to an indexing head).

In accordance with the above, one of the members (e.g. the second member) could be a beam, for example a cross-beam. In this case, one of the members (e.g. the first member) could comprise a support. The beam could be configured to move along the support (e.g. in a first linear degree of freedom). One of the members (e.g. the third member) could comprise a carriage. For example, the carriage could be configured to move along the beam. One of the members (e.g. the fourth member) could comprise a quill. Accordingly, the quill could be configured to carry a tool (e.g. an inspection device, such as a measurement probe), for example such that it can be moved relative to an artefact in at least two, and preferably in at least three, orthogonal degrees of freedom. As described above and below in more detail, the quill could be configured to carry an articulated head, onto which a tool can be mounted.

The at least one magnet (of the ferromagnetic material trap) can comprise an elongate strip magnet. The elongate strip magnet could extend at least partially along the extent of movement of the at least one moveable member.

The at least one magnet (of the ferromagnetic material trap) could be releasably retained to/by the coordinate positioning apparatus. For example, the magnet (of the ferromagnetic material trap) could rest in a groove, channel or the like. Optionally, the magnet (of the ferromagnetic material trap) is accessible via an openable end face of the protective housing/cover, e.g. such that the magnet can be slid out from the coordinate positioning apparatus (e.g. from the protective housing). As will be understood, the end face could be openable in that there is provided at least one openable access port in the end face. Optionally, the whole end face can be opened to facilitate access to the magnet. Optionally, at least a part of the end face is removable to facilitate access to the magnet. For example, the whole of the end face of the protective housing/cover could be removable to facilitate access to the magnet. Optionally, the at least one magnet is releasably fastened to the coordinate positioning apparatus, e.g. via releasable fastening means/at least one releasable fastener.

Optionally, the at least one magnet (of the ferromagnetic material trap) is located at or proximal an opening in the protective housing/cover. Optionally, the at least one magnet extends at least partially along an opening in the protective housing/cover.

Optionally, the at least one magnet (of the ferromagnetic material trap) is located between i) at least one of the at least one motor and the at least one bearing arrangement located in the protective housing/cover, and ii) an opening in protective housing/cover. Optionally, the at least one magnet (of the ferromagnetic material trap) is located between the stator of the motor and said opening. Optionally, the at least one magnet (of the ferromagnetic material trap) is located between the at least one bearing arrangement and said opening.

Optionally, the protective housing/cover comprises an opening, e.g. an elongate opening.

The protective housing/cover could be provided by another member of the coordinate positioning apparatus. Optionally, the at least one moveable member can cooperate with (e.g. engage), and move relative to, the other member of the coordinate positioning apparatus through the opening (in the protective housing/cover).

Optionally, the protective housing/cover is provided by a first of at least two relatively moveable members. Optionally, a second of the relatively moveable members of the coordinate positioning apparatus can cooperate with (e.g. engage), and move relative to, the first relative moveable member, through the opening (in the protective housing/cover).

A seal and/or compliant cover can be provided for restricting the passage of contamination through the opening into the protective housing/cover. Such compliant covers are often referred to as dust covers. For example, one or more of e.g. a labyrinth seal, brush seal/cover, roller blind or bellows can be provided. For example, a compliant cover can extend at least partially over the opening in the protective housing/cover. The compliant cover can be configured to deform and/or move so as to facilitate relative movement of the relatively moveable members whilst restricting the passage of contamination through the opening into the protective housing/cover. The compliant cover can be configured to deform and/or move with movement of the moveable member. A moveable cover can comprise a retractable cover, for example a roller blind or bellows.

A part (e.g. a side/edge) of the moveable cover could be received/located within a track/"cover guideway" for guiding the movement of the moveable cover. The track/"cover guideway" can comprise a channel. The track/"cover guideway" could be provided by the protective housing/cover. A part (e.g. a side/edge) of the moveable cover could be received within a track/"cover guideway" for guiding the movement of the moveable cover. Optionally, first and second parts (e.g. first and second sides/edges) of the moveable cover could each be received within respective first and second tracks/"cover guideways" for guiding the movement of the moveable cover.

The at least one magnet (of the ferromagnetic contamination trap) could be located in or proximal the cover guideway.

The at least one magnet (of the ferromagnetic contamination trap) could be located in a groove. For example, the cover guideway can comprise the groove. In other words, the groove can be provided by/in the cover guideway. The groove can extend along the cover guideway such that dirt and contamination can collect away from the moveable cover. As mentioned above, the cover guideway can comprise a channel. Accordingly, the groove can be located in the channel. In other words, the cover guideway can comprise a (e.g. "primary") channel for guiding the movement of the moveable cover, and a (e.g. "secondary"/"additional"/ "supplemental"/"ancillary"/"distinct") groove in which dirt and contamination can collect away from the moveable cover (e.g. the groove provides a trap for collecting dirt and contamination away from the moveable cover). Accordingly, the groove forms/defines a recessed/distinct/separate region/volume to the channel in which dirt and contamination can collect away from the moveable cover.

The motor can comprise a linear motor. The linear motor can comprise a stator, for example an elongate stator. The stator can comprise an array of magnets. The magnets can be exposed (e.g. within the protective housing). The stator can be fixed relative to the protective housing/cover. As will be understood, this does not necessarily mean that the stator is fixed directly to the protective housing/cover.

The bearing arrangement can comprise an air bearing. The air bearing can comprise an air bearing track. The air bearing track can be fixed relative to the protective housing/cover. As will be understood, this does not necessarily mean that the air bearing track is fixed directly to/mounted on the protective housing/cover.

The coordinate positioning apparatus can comprise a three axis coordinate positioning apparatus. Optionally, the comprise a Cartesian coordinate positioning apparatus. The coordinate positioning apparatus can comprise a coordinate measuring machine (CMM).

This application describes a CMM having a contamination trap, for example a groove and/or magnet, extending along an opening in at least one protective housing/cover. For example, a contamination trap extending along a track for a dust cover.

According to a second aspect of the invention there is provided a coordinate positioning apparatus, comprising a plurality of moveable members for effecting relative movement of a tool relative to a workpiece. The coordinate positioning apparatus can comprise a moveable cover which moves with a moveable member of the coordinate positioning apparatus. A part (e.g. a side/edge) of the moveable cover can be located/received within a track (e.g. a "cover guideway") (e.g. a channel) for guiding the movement of the moveable cover. The track/"cover guideway" can comprise a groove which extends along the track/"cover guideway" in which dirt and contamination can collect away from the moveable cover. In other words, a part of the moveable cover can be located/received within a (e.g. "primary") channel for guiding the movement of the moveable cover, and the channel can comprise a (e.g. "secondary"/"additional"/"supplemental"/"ancillary"/"distinct") groove in which dirt and contamination can collect away from the moveable cover (e.g. the groove provides a trap for collecting dirt and contamination away from the moveable cover). Accordingly, the groove forms/defines a distinct/separate region/volume to the channel in which dirt and contamination can collect. At least one magnet can be located in the groove for attracting/retaining ferromagnetic material. The moveable cover can comprise a retractable cover. Accordingly, the track/"cover guideway" can comprise a retractable cover track. As will be understood, features described in connection with the first aspect of the invention are also applicable to the second aspect of the invention and vice versa.

Accordingly, this application describes a coordinate positioning apparatus, comprising at least one moveable member for effecting relative movement of a tool relative to a workpiece and at least one motor and at least one bearing arrangement for facilitating said relative movement. The at least one motor and/or at least one bearing arrangement being at least partially located within an internal volume of the coordinate positioning apparatus (e.g. at least a part of the at least one motor and/or at least a part of the bearing arrangement can be located within an internal volume of the coordinate positioning apparatus. The coordinate positioning apparatus can further comprise a ferromagnetic contamination trap comprising at least one magnet configured to attract and retain ferromagnetic contamination entering the internal volume. The internal volume could also be referred to as the inside of the coordinate positioning apparatus. The internal volume/inside can be that region inside one or more protective covers of the coordinate positioning apparatus, in particular those covers protecting the bearing-ways/guideways of the coordinate positioning apparatus.

Embodiments of the invention will now be described, by way of example only, with reference to the following drawings, in which:

FIGS. 11a and 11b show the linear motor arrangement for the CMM's y-axis, with FIG. 11b being a detail view of the area A" identified in FIG. 11a;

Figure 1:
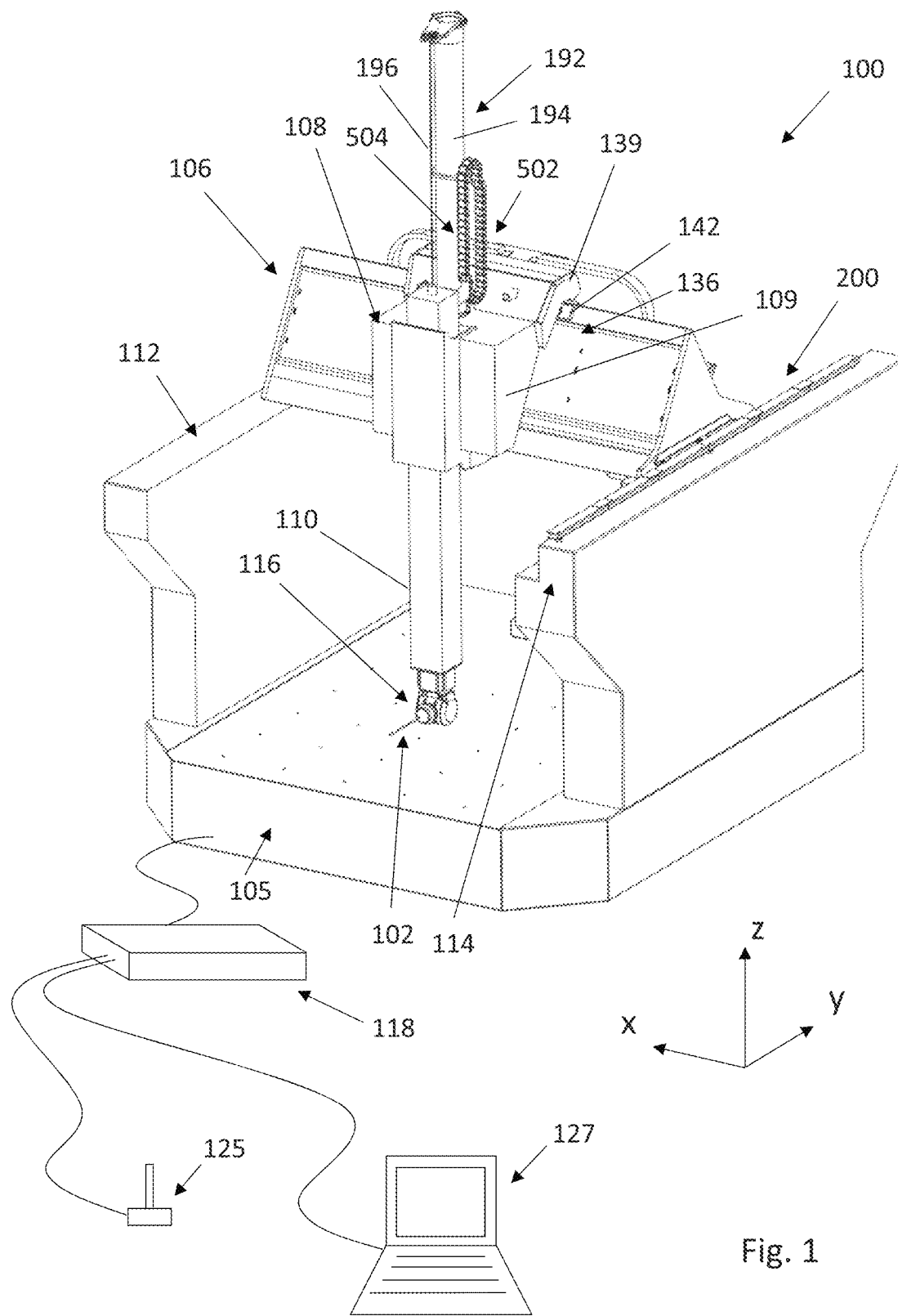
FIG. 1 is a schematic isometric view of the front of a gantry-type CMM according to the present invention.
Figure 2:
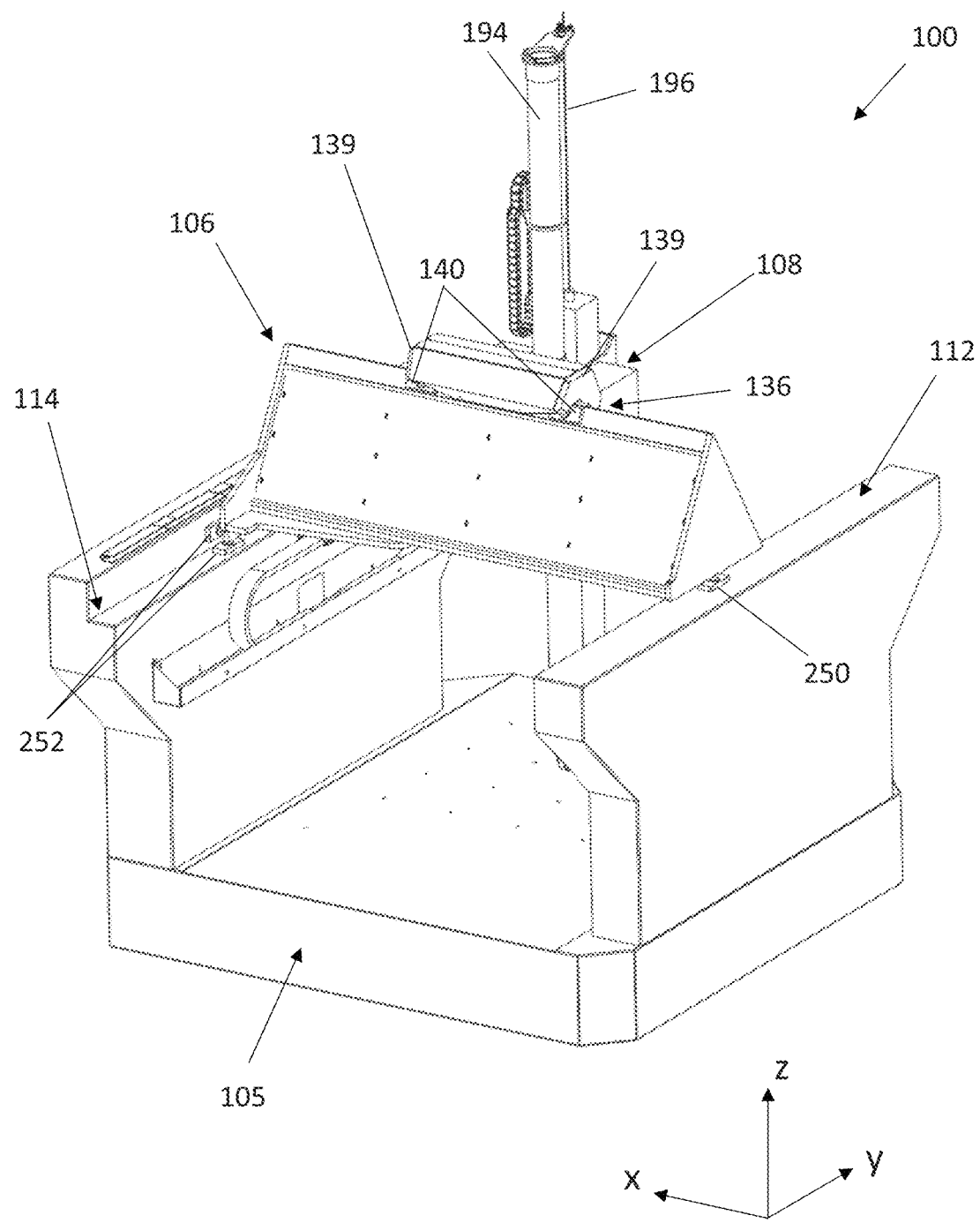
FIG. 2 is a schematic isometric view of the rear of the CMM of FIG. 1.

An overview of an embodiment of how the invention can be implemented will be described below. In this case, the invention is implemented as part of a CMM 100. FIG. 1 shows a CMM 100 with its protective housings/covers (e.g. "main" covers/"hard" covers) removed so that the relevant components of the CMM 100 can be seen.

As shown, a tool, for example an inspection device such as a probe 102 for inspecting a workpiece, can be mounted on the CMM 100. In the embodiment shown, the probe 102 is a contact probe, in particular a contact analogue scanning probe, for measuring the workpiece by a stylus of the probe contacting the workpiece. However, as will be understood the CMM 100 could carry any sort of inspection device, including touch-trigger probes, non-contact (e.g. optical) probes, or another type of instrument if desired.

In the embodiment shown, the CMM 100 is a gantry-style Cartesian CMM and comprises a platform 105 on which an artefact to be inspected can be placed, and a movement system which provides for repeatable and accurate control of the position of the probe 102 relative to the platform 105 in three orthogonal degrees of freedom X, Y and Z.

In particular, the movement system comprises a cross-beam 106, a carriage 108, and a quill 110. The cross-beam 106 extends between first 112 and second 114 raised rail members and is configured to move along the rails along a Y axis via a bearing arrangement (in this embodiment an air bearing arrangement). The carriage 108 sits on and is carried by the cross-beam 106, and is moveable along the cross-beam along an X axis via a bearing arrangement (in this embodiment an air bearing arrangement which is explained in more detail below). The quill 110 is held by the carriage 108, and is moveable relative to the carriage 108 along a Z axis via a bearing arrangement (again, in this embodiment via an air bearing arrangement). A pneumatic counterbalance mechanism for the quill is provided for counterbalancing the weight of the quill 110 so as to reduce the work required of the quill's motor. In particular, the pneumatic counterbalance is configured to provide an opposing force substantially equal to the weight of the quill 110 (and the articulated head 116 and probe 102) such that substantially zero force is required by the quill's motor to keep it at a stationary position. The pneumatic counterbalance comprises a piston (not shown) within the quill 110. The piston is anchored to a tower 194 (in this case a carbon-fibre tube) via a cable 196. The tower 194 is mounted to the carriage 108 so as to move therewith.

As will be understood, motors, for example direct drive motors such as linear motors, can be provided for effecting the relative motion of the various members along their axis. Also, position encoders (not shown) can be provided for reporting the position of the cross-beam 106, carriage 108 and/or quill 110.

In the particular example shown, an articulated head 116 is provided on the lower free end of the quill 110 for carrying the probe 102. In this case, the articulated head 116 comprises two orthogonal rotational axes. Accordingly, in addition to the three orthogonal linear degrees of freedom X, Y and Z, the probe 102 can be moved about two orthogonal rotational axes (e.g. A and B axes). A machine configured with such an articulated head is commonly known as a 5-axis machine.

Articulated heads for tools and inspection devices are well known, and for example described in WO2007/093789. As will be understood, an articulated head need not necessarily be provided, and for example the probe 102 could be mounted to the quill assembly 110 via a fixed head which does not provide any rotational degrees of freedom. Optionally, the probe itself can comprise an articulated member so as to facilitate rotation about at least one axis.

As is standard with measuring apparatus, a controller 118 can be provided which is in communication with the CMM's motors and position encoders (not shown), the articulated head 116 (if present) and the probe 102 so as to send and/or receive signals to and/or from them so as to control the motion of the relatively moveable members as well as receive feedback and measurement data. A computer 127, e.g. a personal computer (which can be separate to or integrated with the controller 118) can be provided which is in communication with the controller 118. The computer 127 can provide a user friendly interface for an operator to, for example, program and initiate measurement routines. Suitable computers and associated control/programming software is widely available and well known. Furthermore, a joystick 125 or other suitable input device can be provided which enables an operator to manually control the motion of the probe 102. Again, such joysticks are well known and widely available.

The structure of the cross-beam 106 will be described in more detail with reference to FIGS. 3 to 10. As shown, in this embodiment the cross-beam 106 comprises a box beam. The box beam 106 has a modular construction, and in particular in this embodiment comprises three elongate corner members 120, 122, 124, and three pieces of sheet material 126, 128, 130, each forming a load bearing facet (in other words, each forming a planar load bearing member) of the box beam, and each extending between a pair of the three elongate corner members. In the embodiment described, the elongate corner members 120, 122, 124 are extruded, i.e. formed via extrusion. In the embodiment described, the thickness of the three pieces of sheet material 126, 128, 130 is not more than 3 mm. They are made from a metallic material, in particular in this embodiment aluminium, although as will be understood other metallic materials such as stainless steel could be used, or non-metallic materials such as carbon fibre or ceramic could be used. In order to reduce bulk and weight, it can be preferred that the load bearing facets (i.e. the planar load bearing members) of the box beam are formed from sheet material no thicker than 5 mm (above which they would more normally be described as being "plates" rather than "sheets").

If desired the three elongate corner members 120, 122, 124 could be made to be substantially identical. This could help to ensure that the three elongate corner members have substantially the same thermal inertia (e.g. same thermal response characteristics) such that they respond to temperature changes in a common way. This can help to avoid deformation (e.g. twisting or bending) of the box beam 106. For the same reasons, the three pieces of sheet material 126, 128, 130 could also be made so as to be substantially identical. However, as will be understood, the corner members (and/or pieces of sheet material) could be designed to have the same thermal inertia so as to achieve the same effect, even if they are not substantially identical, e.g. even if they do not have the same shape or cross-sectional form.

In the described embodiment, the three elongate corner members 120, 122, 124 and the three pieces of sheet material 126, 128, 130 are formed from the same material type (e.g. aluminium).

In the described embodiment, the first elongate corner member 120 provides first 132 and second 134 bearing surfaces against which air bearings can bear. In the described embodiment, the carriage 108 comprises first and second air bearing assemblies which each comprise first 140 and second 142 air bearing pads connected to each other and to main body 109 of the carriage 108 via a mounting bracket 139 (omitted from FIGS. 4 to 6). The first and second air bearing assemblies straddle the first elongate corner member 120, such that the first air bearing pads 140 bear against the first bearing surface 132 and the second air bearing pads 142 bear against the second bearing surface 134.

In its assembled state, the box beam 106 and carriage 108 are pre-loaded against each other. Such pre-load could be provided by gravity and/or by spring loading. For example, air bearings pads 140, 142, 143 (see FIG. 4) could be rigidly mounted to the carriage 108 (not shown in FIG. 4) and air bearing pad 145 could be spring mounted to the carriage 108 to provide the pre-load.

Figure 5:
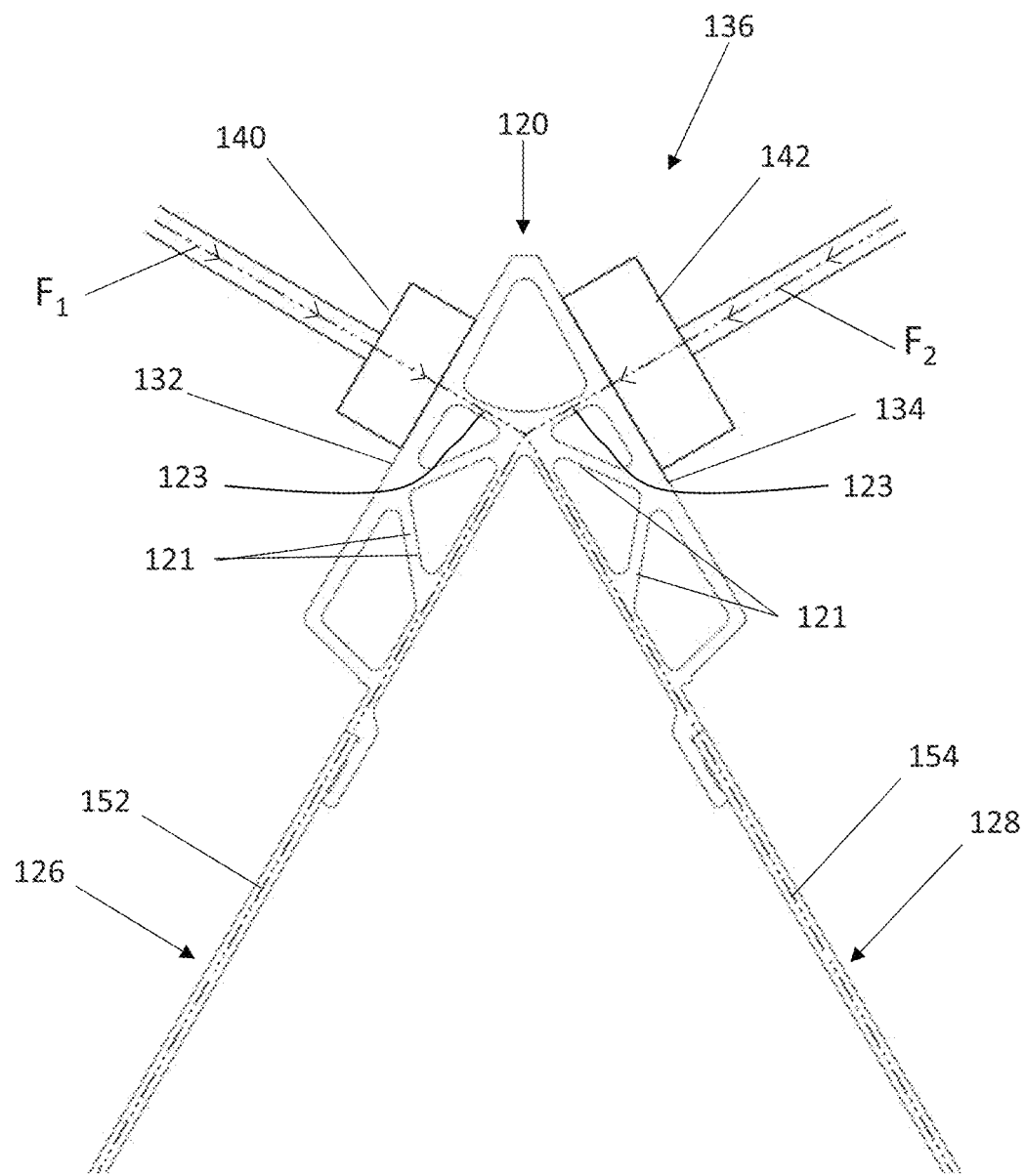
FIGS. 5 and 6 are detail views of the area A identified in FIG. 4.

As schematically illustrated in FIG. 5, the pre-load causes the first 140 and second 142 bearing pads to exert a force on the box beam 106, respectively illustrated by first and second vectors $F_1$, $F_2$. As illustrated, the apparatus is configured such that the forces $F_1$, $F_2$ intersect at the same point at which the planes of the first 126 and second 128 pieces of sheet material intersect. This ensures that the forces transferred into the first elongate corner member 120 can be resolved (and hence the forces can be transferred) directly into/along the (e.g. shear) plane of the first 126 and second 128 pieces of sheet material. Accordingly, the pre-load force, is carried directly along the plane of the sheet material. This helps to avoid buckling of the sheet material and can mean that thinner (and therefore lighter) sheets can be used to support a given pre-load compared to a configuration in which the pre-load forces cannot be carried directly along the plane of the sheet material.

In the embodiment shown, first 140 and second 142 bearing pads are arranged to straddle the first elongate corner member 120. It is known that the forces $F_1$, $F_2$ will be transferred perpendicularly into the first 132 and second 134 bearing surfaces of the first elongate corner member 120. It therefore follows that the forces $F_1$, $F_2$ from the first 140 and second 142 bearing pads will intersect at a predictable point (point 150 shown in FIGS. 6 and 7). This point is predictable along the length of the first elongate corner member 120, and so could be described as being a predictable intersection line. In other words, in this embodiment the forces imparted into the first elongate corner member 120 by the first 136 air bearing assembly at each of the points of cooperation between the two is directed so as to intersect a predetermined elongate target line that extends parallel to the first elongate corner member 120. Since the point of intersection 150 (and hence the elongate target line) is known and is predictable, it is possible to configure the box beam 106 such that the planes 152, 154 of the first 126 and second 128 pieces of sheet material also intersect at substantially the same point (along the same line).

Figure 6:
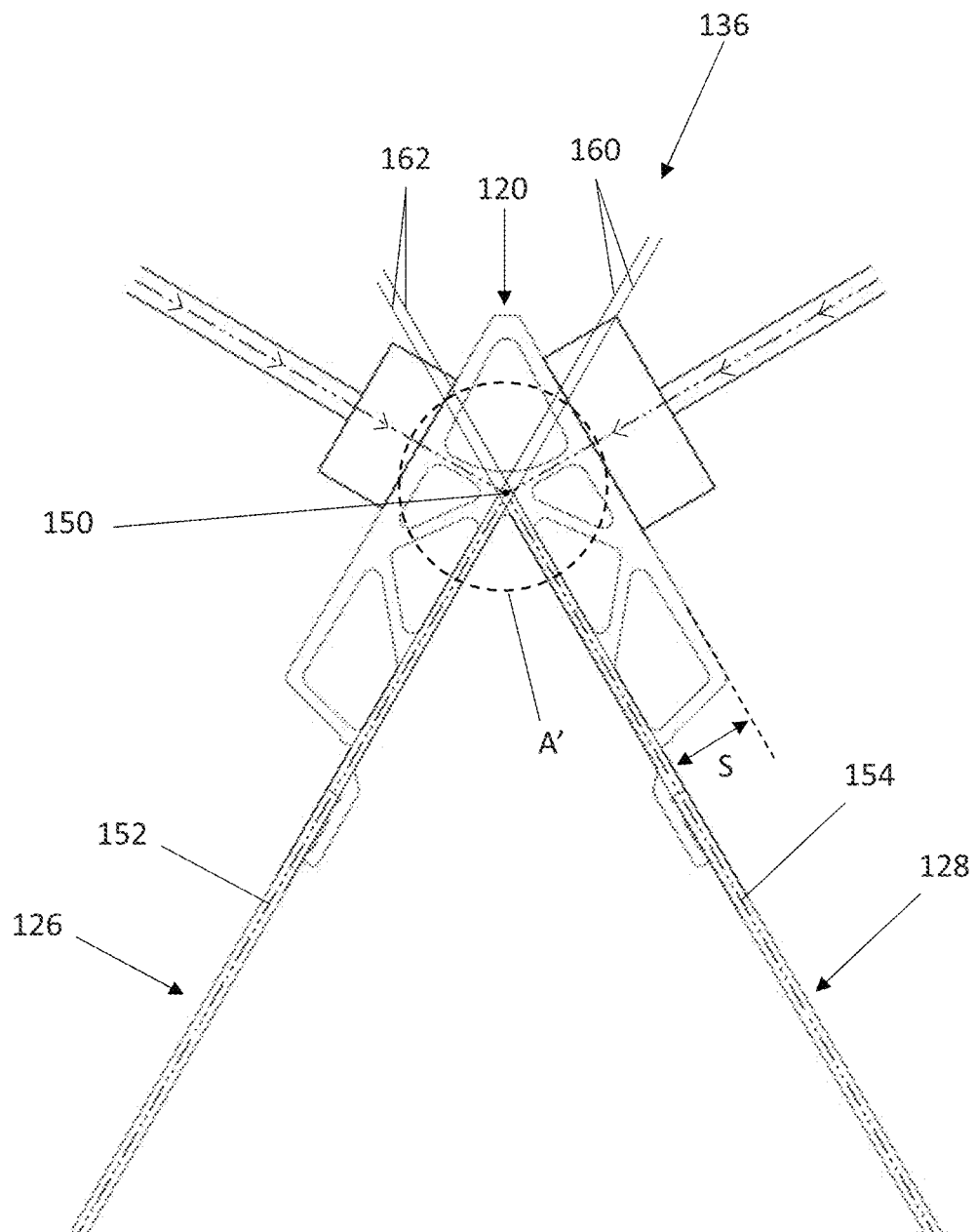
Figure 7A:
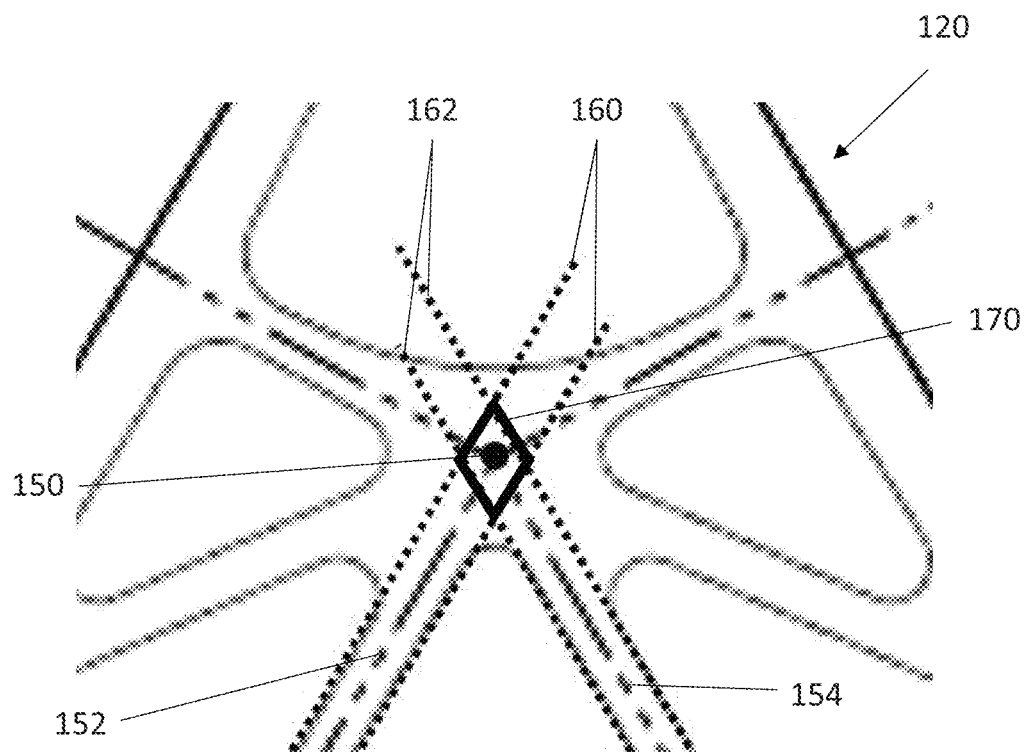
FIGS. 7a and 7b are detail views of the area A' identified in FIG. 6.
Figure 7B:
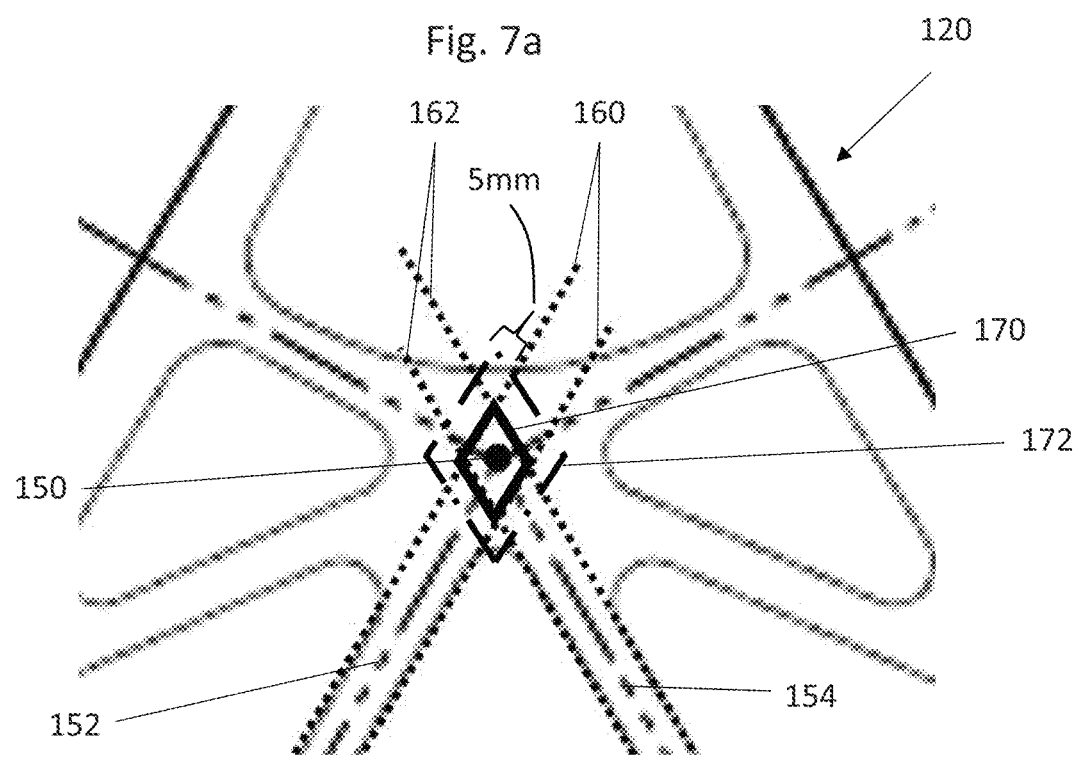

Moreover, as illustrated by FIGS. 6 and 7, in order to ensure that the pre-load forces are primarily carried in/along the (e.g. shear) plane of the first 126 and second 128 pieces of sheet material, it is possible to configure the box beam 106 such that the point of intersection 150 (and i.e. the elongate target line) falls within the vicinity of a notional elongate volume (a cross-section of which is highlighted by the diamond shape 170 shown in FIGS. 7a and 7b) defined by the intersection of a first pair of planes 160 containing the front and back surfaces of the material of the first piece of sheet material 126 (which defines a first load bearing facet/planar load bearing member) with a second pair of planes 162 containing the front and back surfaces of the material of the second piece of sheet material 128 (defining a second load bearing facet/planar load bearing member). In this embodiment, this is facilitated by making the bearing surfaces (e.g. 132, 134) of the elongate bearing tracks (e.g. 120) sit substantially proud relative to the adjacent pieces of sheet material (e.g. 126, 128). In this case, the step S between the surface of the adjacent pieces of sheet material and the bearing surfaces is approximately 18 mm. Also, as indicated in FIG. 5, the extruded bearing tracks 120 are substantially hollow, but comprise a plurality of reinforcing webs 121, 123. As shown, there is one web on each side of the corner which (i.e. web 123) extends perpendicular to the bearing surfaces 132, 134 and is located centrally with respect to the bearing pads 140, 142, such that the pre-load is carried directly through it.

Whilst it can be preferred that the point of intersection 150 falls inside said notional elongate volume 170, it can be sufficient for said point of intersection 150 to be in the vicinity of said notional elongate volume 170. For example, as illustrated in FIG. 7b, it can be sufficient for said point of intersection to be within a greater notional volume 172 which is centred on, but having up to 100% cross-sectional area than that of the notional elongate volume defined by the intersection of a first pair of planes 160 containing the front and back surfaces of the material of the first piece of sheet material 126 with a second pair of planes 162 containing the front and back surfaces of the material of the second piece of sheet material 128. Rather than being measured proportionally, the greater notional volume 172 could be determined absolutely, e.g. as illustrated in FIG. 7b, the greater notional volume which is centred on the notional elongate volume, could have a cross-sectional extent that is greater than that of the notional elongate volume by not more than 5 mm on all sides. Such a configuration can help to ensure that the pre-load forces are primarily carried in/along the (e.g. shear) planes of the first 126 and second 128 pieces of sheet material.

Figure 4:
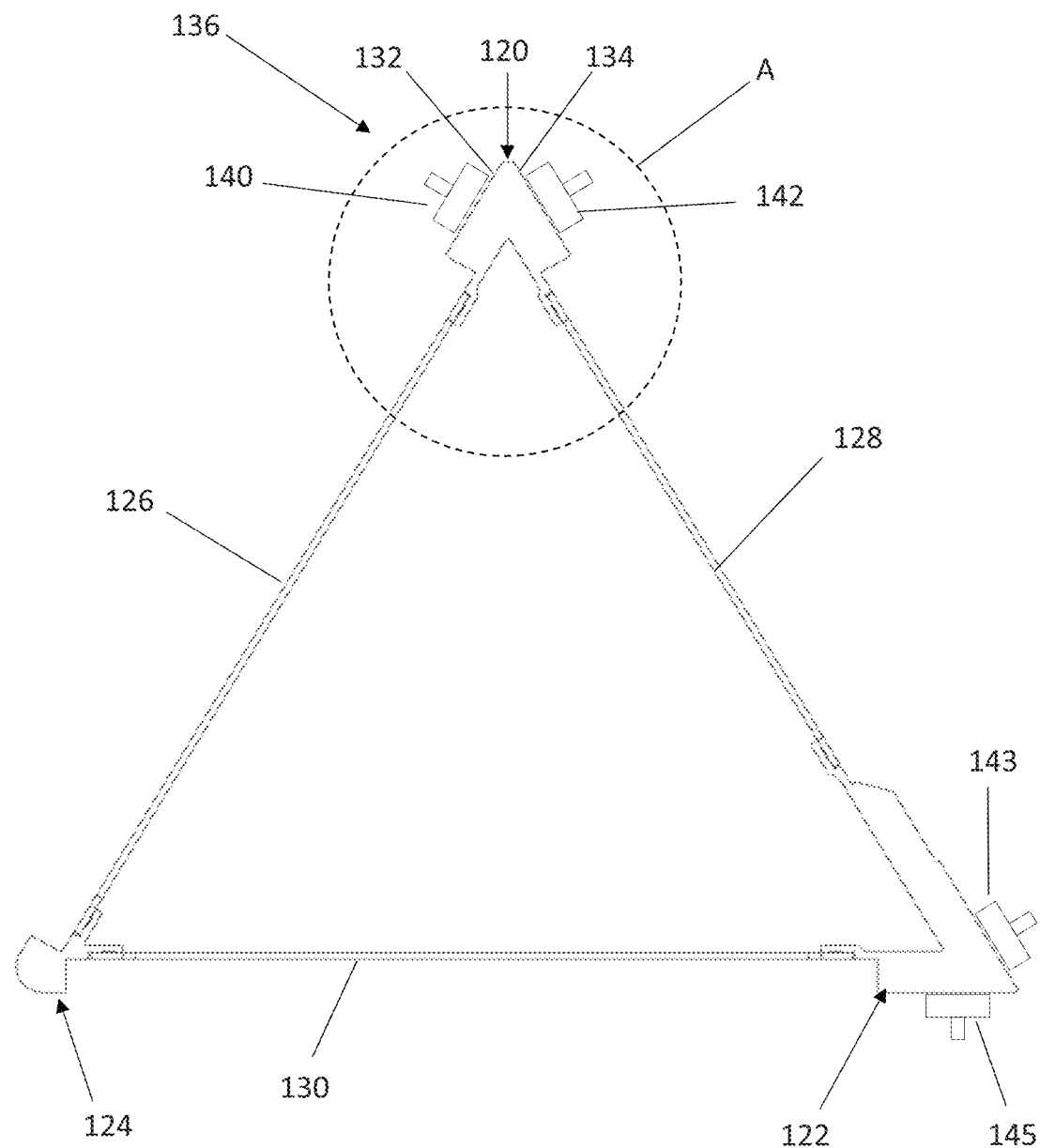
FIG. 4 is a cross-sectional view of the cross-beam of FIG. 3.

The same bearing arrangement is provided between the bearing assemblies on the carriage 108 and the second elongate corner member 122 as schematically illustrated in FIG. 4, such that the pre-load forces imparted into the second elongate corner member 122 is primarily carried in/along the (e.g. shear) planes of the second 128 and third 130 pieces of sheet material.

Figure 3:
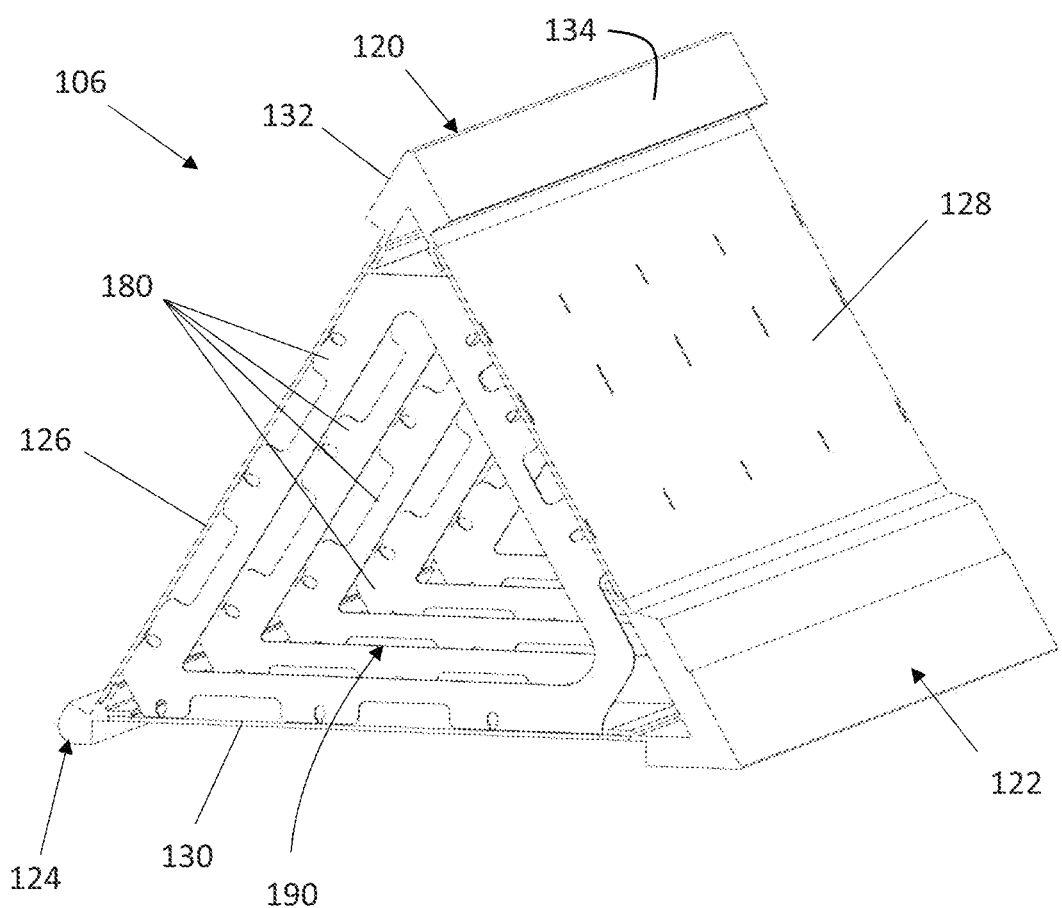
FIG. 3 is a schematic isometric view of the cross-beam of the CMM of FIG. 1.
Figure 8:
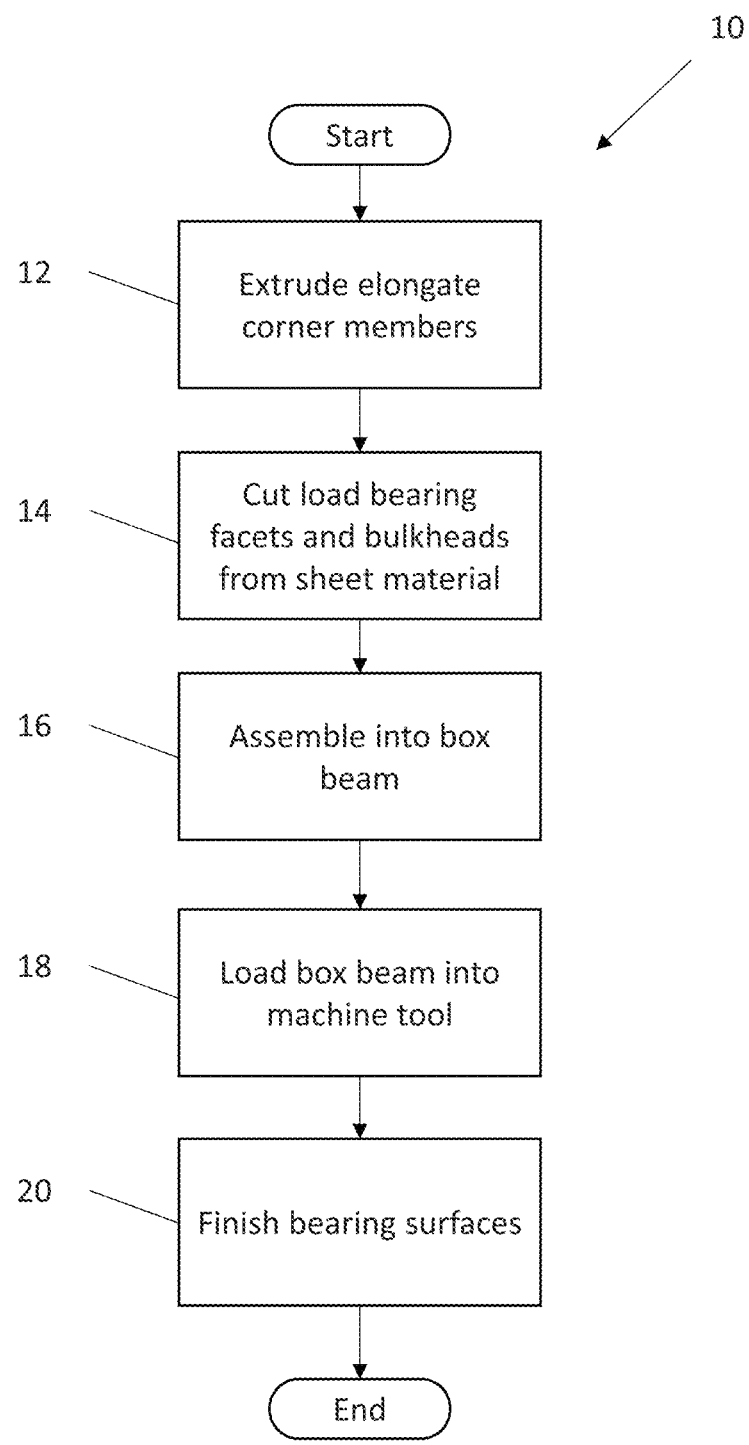
FIG. 8 is a flow chart illustrating an example method of manufacturing the cross-beam of FIG. 3.
Figure 9:
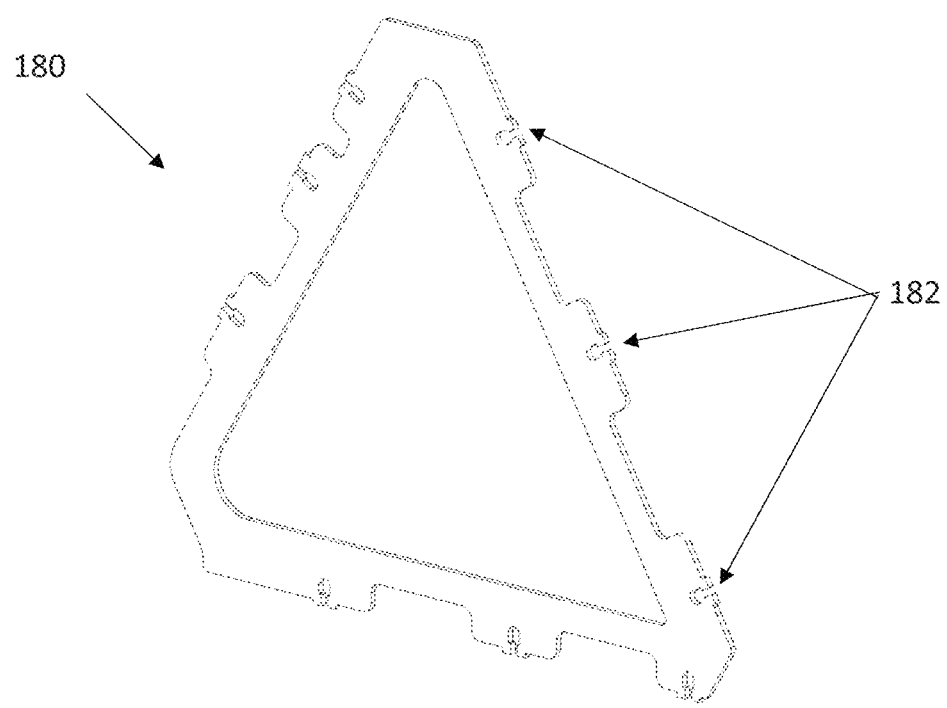
FIG. 9 shows a bulkhead in isolation.

Since the pre-load forces are primarily carried in/along the (e.g. shear) planes of the first 126, second 128 and third 130 pieces of sheet material of the box beam 106, the inventors have found that other supporting structures like bulkheads are not necessary for supporting the pre-load forces. However, as shown in FIG. 3, the box beam 106 of the present embodiment does have a plurality of bulkheads 180 (shown in isolation in FIG. 9). Providing bulkheads can help manufacture of the beam. The bulkheads can also aid assembly of the different pieces of the box beam by holding them in place during assembly. Also, if the elongate corner members need to be machined to improve their bearing surfaces, and if this machining is done after assembly of the box beam 106, then the bulkheads can help to provide support during such machining. FIG. 8 illustrates an example process 10 for manufacturing the box beam 106. As illustrated, after manufacture of the different parts of the box beam 106 (e.g. after extrusion of the first to third elongate corner members at step 12 and cutting of the first to third pieces of sheet material and the bulkheads at step 14) they are assembled into the box beam at step 16. (As will be understood, the manufacturing steps 12 and 14 could be performed by different parties at different stages to the assembly step 16). In the described embodiment, the assembly step 16 involves joining the first 126, second 128 and third 130 pieces of sheet material to the bulkheads 180 and attaching the first 120, second 122 and third 124 elongate corner members to the first 126, second 128 and third 130 pieces of sheet material.

Figure 10:
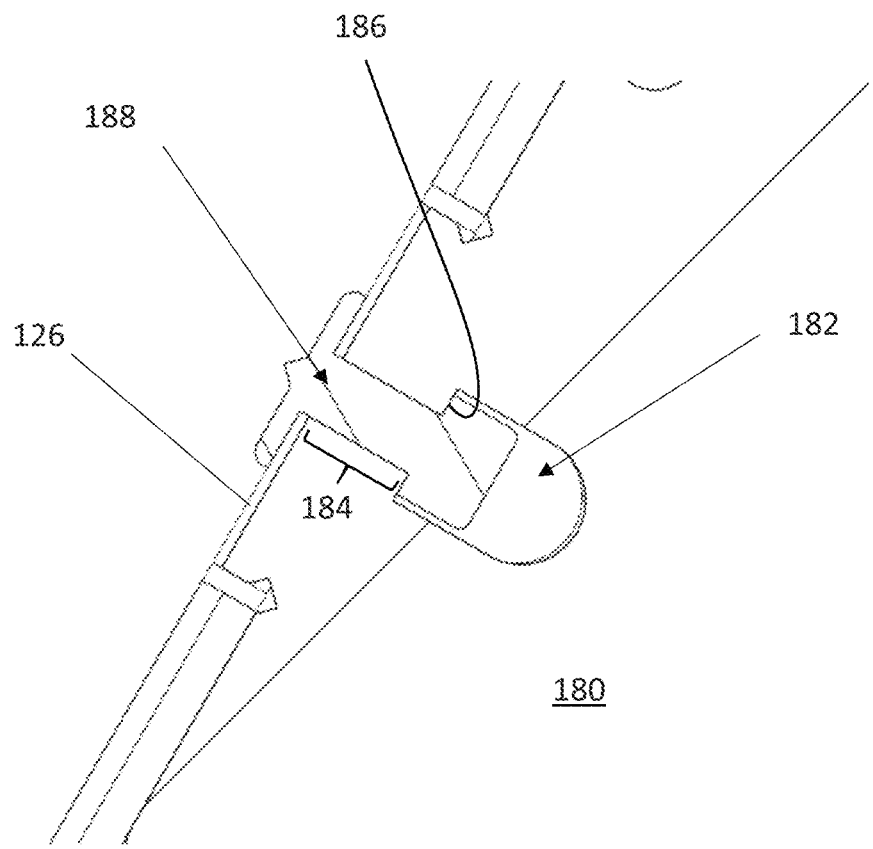
FIG. 10 is a cross-sectional view showing how the load bearing facets of the box structure of the cross-beam of FIG. 3 is riveted to the bulkheads.

As shown, the bulkheads 180 are, in the described embodiment, pop/blind riveted "end-on" to the first 126, second 128 and third 130 pieces of sheet material (e.g. as opposed to a folded flap on the bulkheads). This ensures that loads which are directed orthogonally into the first 126, second 128 and third 130 pieces of sheet material are primarily carried in/along the (e.g. shear) plane of the bulkhead 180 enabling them to be made from thinner sheets of material (thereby saving weight). Such an arrangement is possible by the provision of recesses 182 (see FIG. 9) in the edges of the bulkheads which have a narrowed/restricted neck 184, through which the pop/blind rivets 188 can be accepted. When the rivet is expanded, it can grip against the sides of the recess 182 (e.g. against an inside shelf 186 at the end of the neck 184) thereby securing the bulkhead to the sheet of material (e.g. the first piece of sheet material 126 as shown in FIG. 10) which provides the load bearing facet/planar load bearing member of the box beam 106.

In the described embodiment, the varies pieces of the beam 106 are then glued together using adhesive. For example, the first 120, second 122 and third 124 elongate corner members are glued to the first 126, second 128 and third 130 pieces of sheet material (e.g. via an appropriate adhesive, such as a single part, heat cured, epoxy, for example PERMABOND® ES569 available from Permabond Engineering Adhesives Limited). Also, the bulkheads 180 can be glued to the first 126, second 128 and third 130 pieces of sheet material (e.g. using the same adhesive).

Once assembled, the box beam 106 is then loaded into a machine tool (not shown) at step 18 (see FIG. 8). In the embodiment described, this is done via the end bulkheads 180 which have mounting features in the form a hole 190 which a corresponding mating member on the machine tool can engage. In view of this, the end bulkheads can be thicker than the inner bulkheads in order to withstand the mounting forces. For example, the end bulkheads could be 6 mm thick whereas the inner bulkheads could be 3 mm thick since the inner bulkheads.

Once loaded into the machine tool, the first 122 and second 122 elongate corner members are machined at step 20 to improve the finish of the air bearing surfaces (e.g. 132, 134), e.g. to make them flatter/smoother and optionally to improve how parallel they are to each other.

Figure 11A:
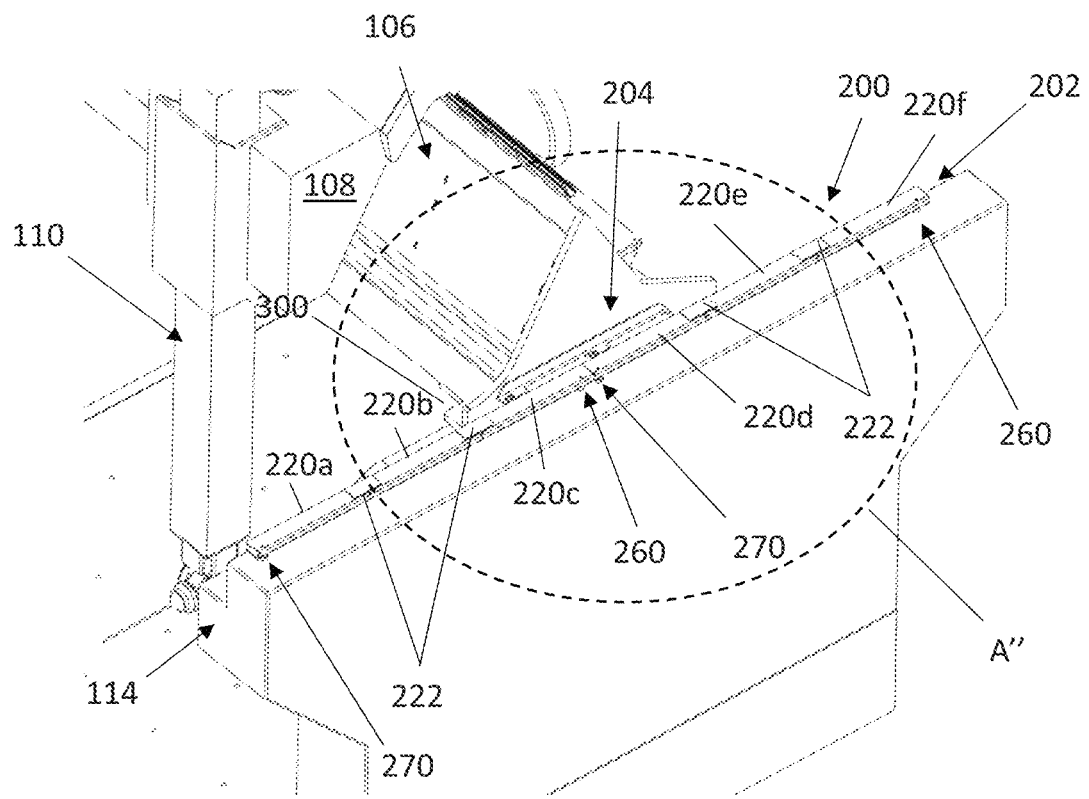
Figure 11B:
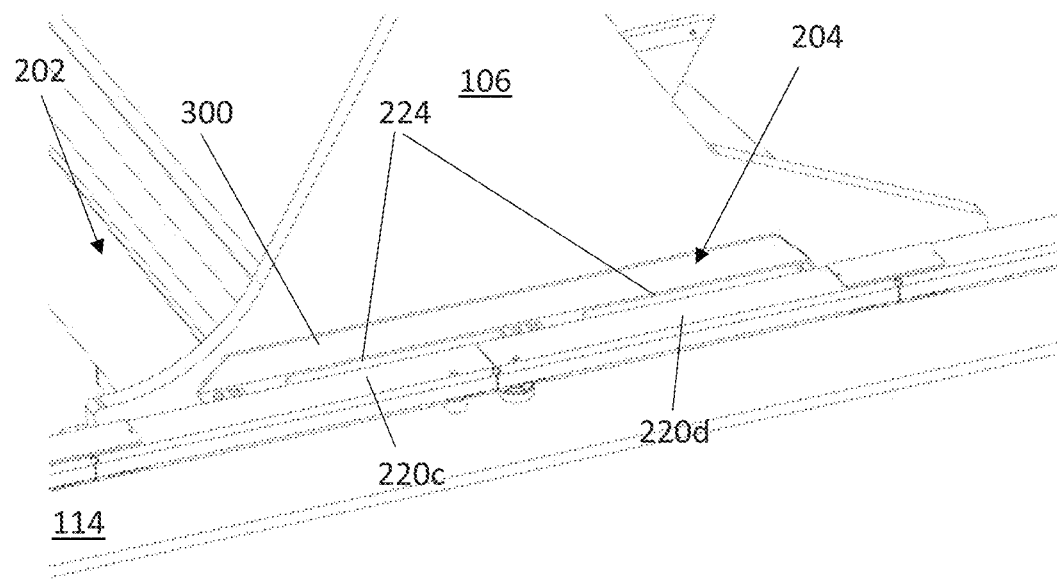
Figure 12A:
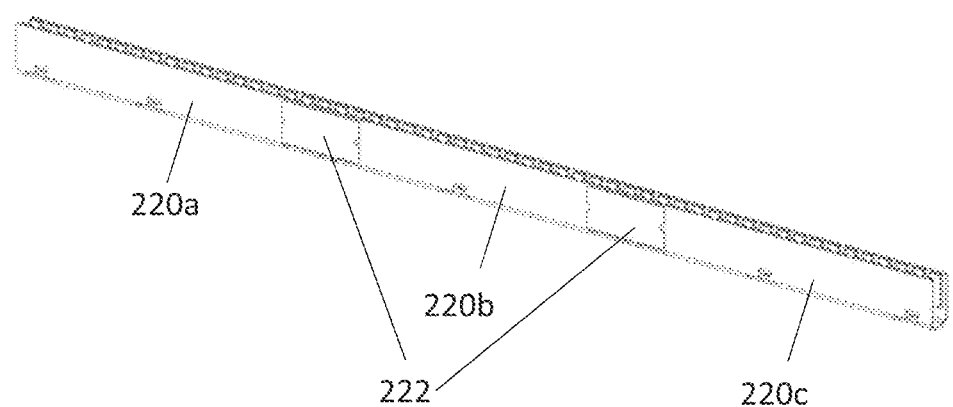
FIG. 12a shows a stator assembly of the linear motor of FIG. 11 in isolation.
Figure 12B:
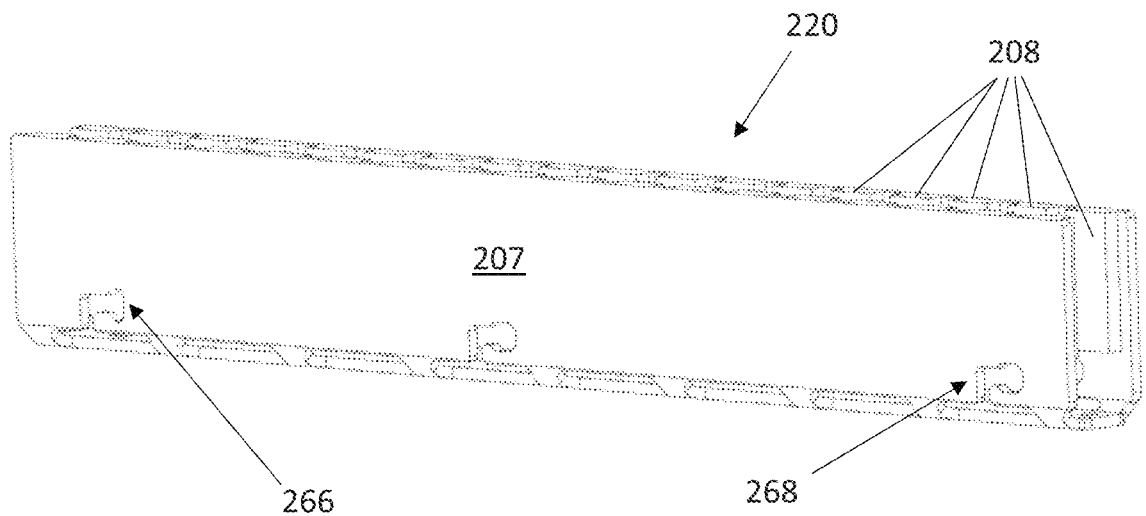
FIG. 12b shows a module of the stator assembly of FIG. 12a in isolation.
Figure 13:
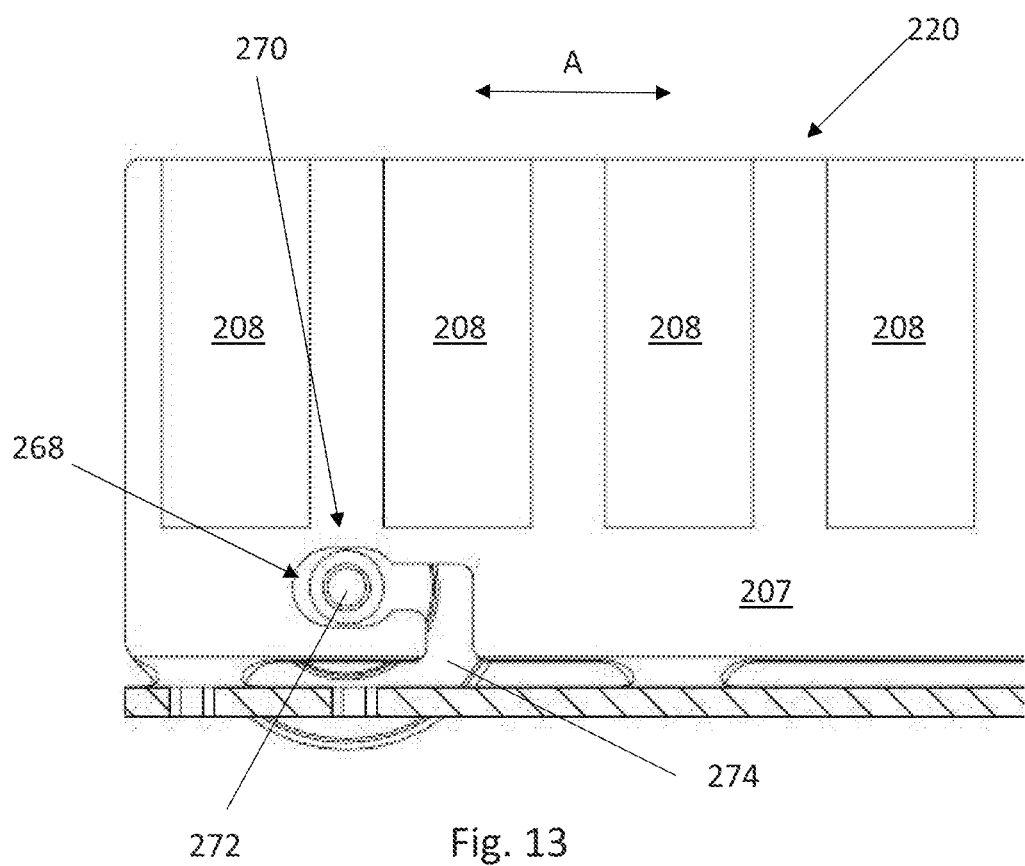
FIGS. 13 and 14 shows the compliant mount assembly of the stator assembly of FIG. 12 in plan and cross-sectional view respectively.
Figure 14:
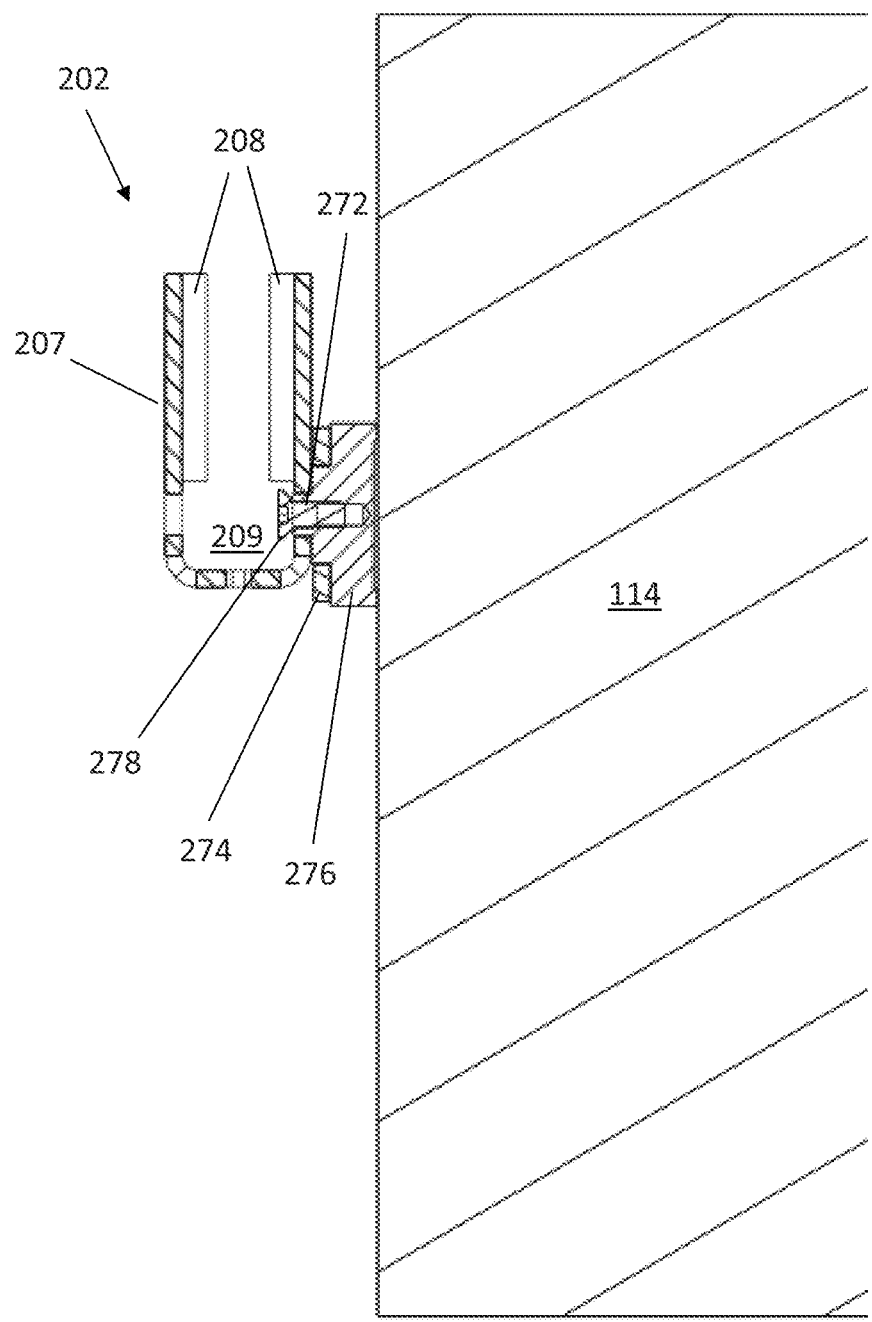
Figure 15:
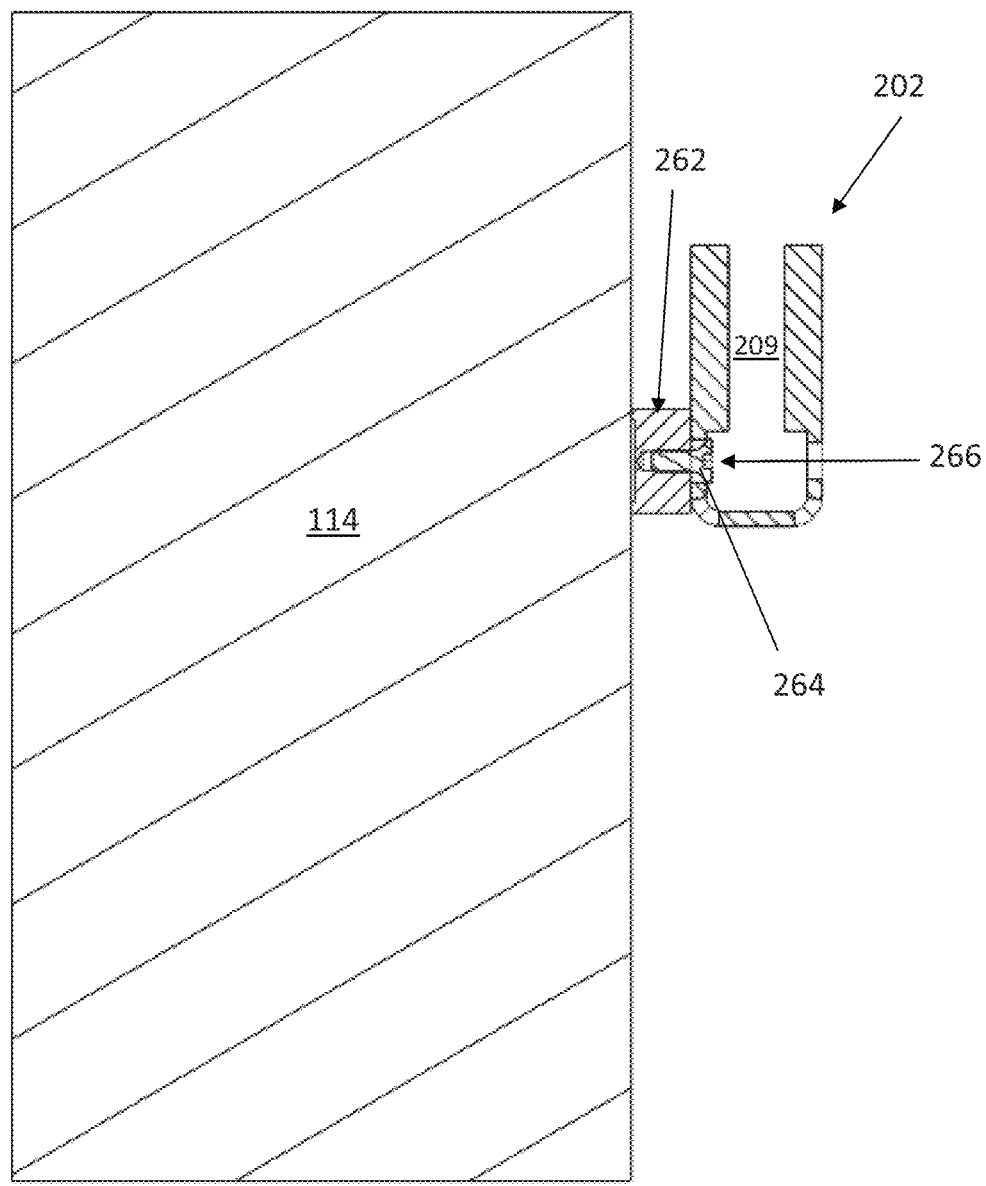
FIG. 15 shows the fixed mount assembly of the stator assembly of FIG. 12 in cross-sectional view.
Figure 16:
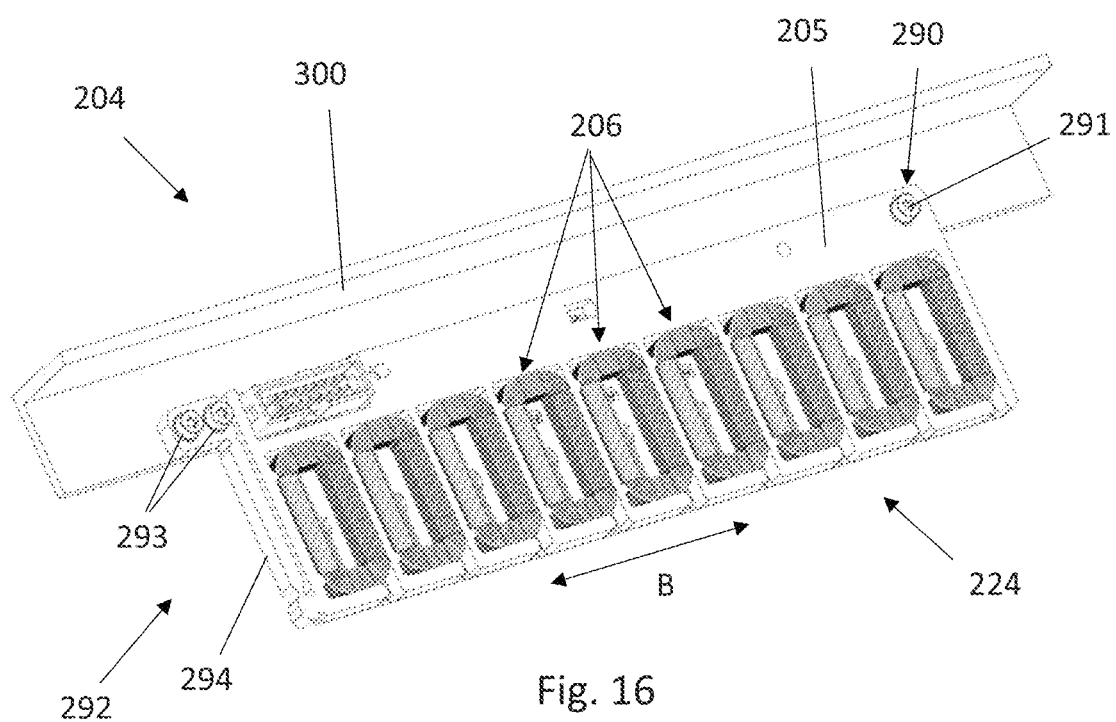
FIG. 16 shows an isometric view of an armature assembly of the linear motor of FIG. 3.

In the embodiment described a direct drive motor 200, in particular a linear motor 200, is used to drive the cross-beam 106 along the y-axis. A linear motor can be advantageous in that it can help to facilitate a servo system with high servo stiffness. The arrangement of the linear motor 200 on the CMM 100 is shown in FIGS. 11a and 11b, and will be described in more detail in connection with FIGS. 1 to 16. As shown, the linear motor 200 comprises a stator 202 and an armature 204. The armature 204 is mounted to the cross-beam 106 (which in this embodiment is formed from aluminium), and the stator 202 is mounted to the second raised rail member 114 (also formed from aluminium). As will be understood, the armature 204 comprises a plurality of coils 206 mounted to a body 205 (e.g. as shown in FIG. 16) and the stator 202 comprises a plurality of magnets 208 mounted along its length on opposing inner sides of a U-shaped body 207 (e.g. as shown in FIGS. 12 to 14), so as to define a channel 209 in which the armature can be received. In the embodiment described the U-shaped body 207 comprises a steel material, which is particularly appropriate for a linear motor stator body (for containing the magnetic field of the stator's magnets 208 and improving the magnetic flux density). Also, in the embodiment described, the body 205 of the armature is made from a non-ferrous material such as aluminium. As will be understood by those familiar with linear motors, current can be passed through the armature's coils 206 in a controlled manner so as to cause the armature 204 (and hence the cross-beam 106 to which it is fixed) to be pushed along the stator 202 (and hence along the first 112 and second 114 raised rail members). In the embodiment described, the linear motor is an ironless core linear motor. This reduces forces between the armature and stator in directions other than in the direction of motion, thereby reducing the stiffness requirements of their respective mounts, and thereby reducing forces on the metrology loop (which could vary along the axis if the armature and stator are not perfectly aligned). As shown, the coils of the armature are not overlapping.

In this embodiment, air bearings facilitate low-friction motion between the cross-beam 106 and the first 112 and second 114 raised rail members. In particular, at a first end of the cross-beam 106 there is provided a first air bearing arrangement comprising an air bearing pad 250 which bears against the first raised rail member 112. At the opposing, second end, of the cross-beam 106 there is provided a second air bearing arrangement comprising a plurality of air bearing pads 252 which bear against different facets of the second raised rail member 114. As will be understood, additional air bearing pads to those shown may be provided, e.g. so as to provide a pre-load between the beam 106 and the first 112 and second 114 raised rail members. As will be understood, other types of bearing, including mechanical bearings, can be used as well as or instead of the air bearings.

In the embodiment described, the stator 202 comprises a plurality of stator modules 220 (which in this embodiment are identical, although this need not necessarily be the case) which are connected to each other via connector members 222 (in this case plates 222 which are bonded to adjacent stator modules) so as to provide two stator assemblies. In particular, a first stator assembly comprises first 220a, second 220b and third 220c stator modules connected in series via plates 222, and a second stator assembly comprises fourth 220d, fifth 220e and sixth 220f stator modules connected in series via plates. FIG. 12a shows a stator assembly in isolation comprising a plurality of stator modules (e.g. 220a, 220b, 220c) connected via plates 222. As will be understood, a stator assembly can essentially be considered to be equivalent to one stator module, and so the explanations below in connection with the stator assembly is equally applicable to a stator assembly comprising a single stator module (shown in FIG. 12b in isolation) and vice versa. In other words, a stator assembly could comprise just a single stator module (e.g. having just a single unitary U-shaped body, rather than separate bodies joined together by plates 222)

In the embodiment described, the armature 204 also comprises a plurality of armature assemblies 224 (which in this embodiment are identical, although this need not necessarily be the case) which are each connected to a bracket 300. For simplicity, FIG. 16 shows only one armature assembly 224. As will be understood, even though in the described embodiment there is provided an armature 204 comprising a plurality of armature assemblies 224, this need not necessarily be the case, and the armature could comprise just one armature assembly. (Also, in the described embodiment, each armature assembly 224 comprises just a single armature module, but as with the stator assembly of the described embodiment, an armature assembly 224 could comprise a plurality of armature modules connected together, e.g. via plates. As per the composite stator assembly, such a composite armature assembly could be fixed to the bracket toward a first end via the rigid mounting of one of the armature modules, and fixed to the bracket toward a second end via the flexible mounting of one of the other armature modules).

Such a modular arrangement of the stator and/or armature can aid manufacture of the CMM 100.

As described in more detail below, each stator assembly and each armature assembly is mounted to its respective member in a way which permits longitudinal expansion and/or contraction relative to its respective member. With regard to the stator assemblies (e.g. the first stator assembly comprising the first 220a, second 220b and third 220c stator modules), this is achieved in the particular embodiment described by providing the stator assembly with a fixed mounting assembly 260 at one end and a compliant mounting assembly 270 at its other end. With reference to FIG. 15, the fixed mounting assembly 260 is illustrated. As shown, the fixed mounting assembly 260 comprises a spacer member 262 which is rigidly secured to the second raised rail member 114 (e.g. via bonding and/or screwing) and a screw 264 which extends through a hole/slot 266 provided at a first end of the stator 202/stator module 220 (e.g. see FIG. 12). The screw 264 is received in a threaded bore in the spacer member 262 and is tightened so that the screw's 264 head engages the body 207 of the stator 202/stator module 220 so as to rigidly clamp the stator 202/stator module 220 to the spacer member 262 and therefore to the second raised rail member 114.

With reference to FIGS. 13 and 14, the compliant mounting assembly 270 comprises an elongate slot 268 (see also FIG. 12) formed in the body 207 at the first end of the stator 202/stator module 220 (at the end opposite to the hole/slot 266) and a sliding mount. The sliding mount comprises a spacer member 276 a post member 272 (which extends into the slot to control the transverse location of the stator assembly/stator module 220) and a magnet 274 which is configured to attract and hold the steel body 207 of the stator assembly/stator module 220 to the spacer member 276 (and therefore to the second raised rail member 114). In the embodiment described the magnet 274 is ring-shaped and extends around the post member 272. The elongate slot 268 and post member 272 are configured so that the stator 202/stator module 220 and post member 272 are free to slide relative to each other along the length of the elongate stator assembly/stator module 220 (i.e. in the direction of arrow A in FIG. 13). By way of such relative sliding, relative expansion and/or contraction of the stator assembly/stator module 220 and the member it is mounted on (in this case the second raised rail member 114) is facilitated. As will be understood, such relative expansion and/or contraction could be as a result of heat from the motor and/or due to differences in coefficients of thermal expansion of the parts which mean that they expand/contract at different rates with changes in ambient temperature.

As is also shown in FIG. 14, a screw 278 can be screwed into a threaded bore in the post 272. However, unlike the screw 264 of the fixed mounting assembly 260, the head of the screw 278 of the compliant mounting assembly 270 does not engage the body 207 of the stator 202/stator module 220 and so does not act to clamp the stator 202/stator module 220 to the spacer member 276 and therefore to the second raised rail member 114. Rather, there is a small gap between the head of the screw 272 and the body 207. Accordingly, the screw 272 merely acts as a safety mechanism to prevent the stator 202/stator module 220 from being pulled off the second raised rail member 114.

Each of the first and second stator assemblies can be mounted in this way, with a gap between them to facilitate their expansion. Also, as will be understood, rather than connected stator modules into stator assemblies, each stator module could be connected individually, for example in the way described above, with gaps between each of them to facilitate their expansion. Alternatively, there could be provided just one monolithic stator module (again mounted in the manner described above via fixed and compliant mounting assemblies). This is also the case for the armature as described in more detail below.

As will be understood, such expansion/contraction can be facilitated in other ways. For example, with reference in particular to FIG. 16, an armature assembly 224 of the armature 204 comprises a fixed mounting assembly 290 at one end and a compliant mounting assembly 292 at another end. The fixed mounting assembly 290 comprises a screw 291 which extends through a hole in the body 205 of the armature module 224 and engages a threaded bore in a bracket 300 (which is in turn rigidly mounted to the cross-beam 106) so as to rigidly clamp the body 205 of the armature assembly 224 to a bracket 300. At the other end, the compliant mounting assembly 292 comprises a flexure arm 294. A first end of the flexure arm is screwed rigidly to the bracket 300 via (in this case) two screws 293, and at the second end is attached to the body 205 of the armature module 224. The flexure arm 294 is configured to flex in the longitudinal direction of the armature module 224 (i.e. in the direction of arrow B) so as to facilitate relative expansion and/or contraction of the bracket 300 and the armature module 224, but is relatively stiff in directions perpendicular thereto (i.e. in directions perpendicular to arrow B).

Such an arrangement could be used in place of the sliding mount of the stator module 220/stator 202, and vice versa.

The arrangements described help to accommodate longitudinal expansion and/or contraction of the armature assembly and/or stator assembly relative to its respective member, whilst maintaining the servo stiffness of the apparatus.

In the embodiment described, both the stator assemblies and the armature assemblies are mounted to their respective members in a way which permits longitudinal expansion and/or contraction relative to its respective member. However, as will be understood, it is possible for just the stator assemblies or just the armature assemblies to be mounted in such a way to permit longitudinal expansion and/or contraction relative to its respective member.

The linear motor arrangement is described above in connection with the CMM's y-axis. As will be understood, the same or a similar arrangement can be used for effecting motion in the x and/or z axes. Likewise, similar bearing arrangements (e.g. air bearings) can be used for the x and/or z axes.

Figure 17:
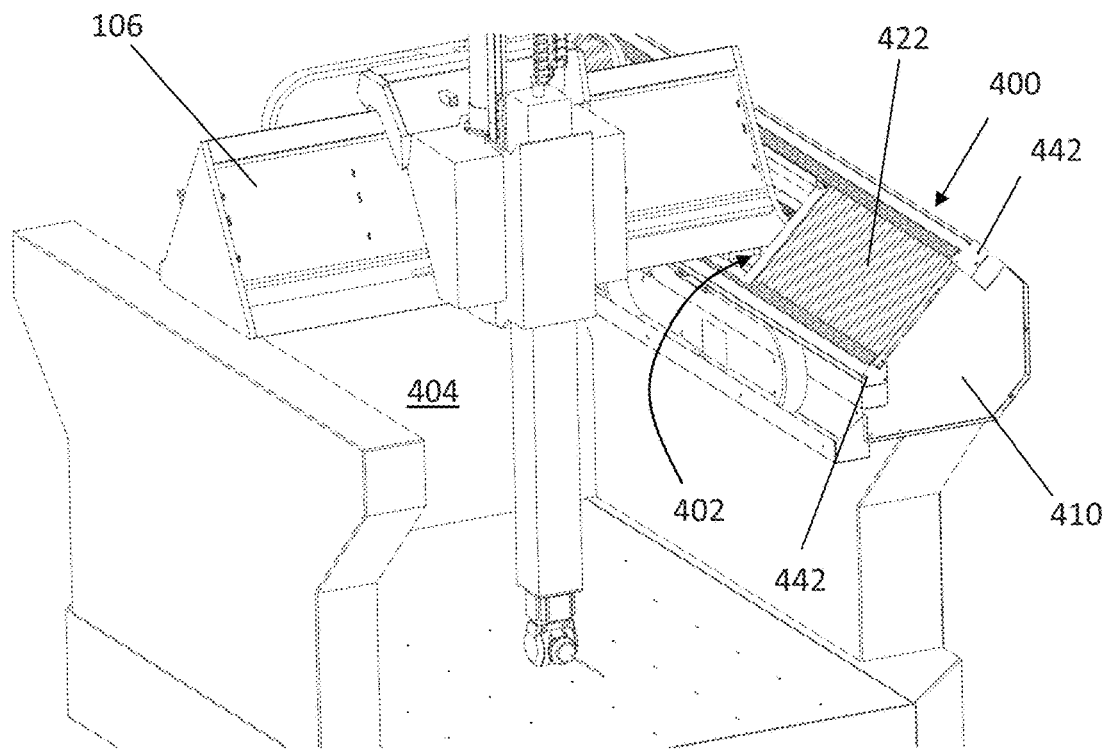
FIG. 17 shows a schematic isometric view of the gantry CMM of FIG. 1 with a protective housing located over one of the raised rails of the y-axis.
Figure 18:
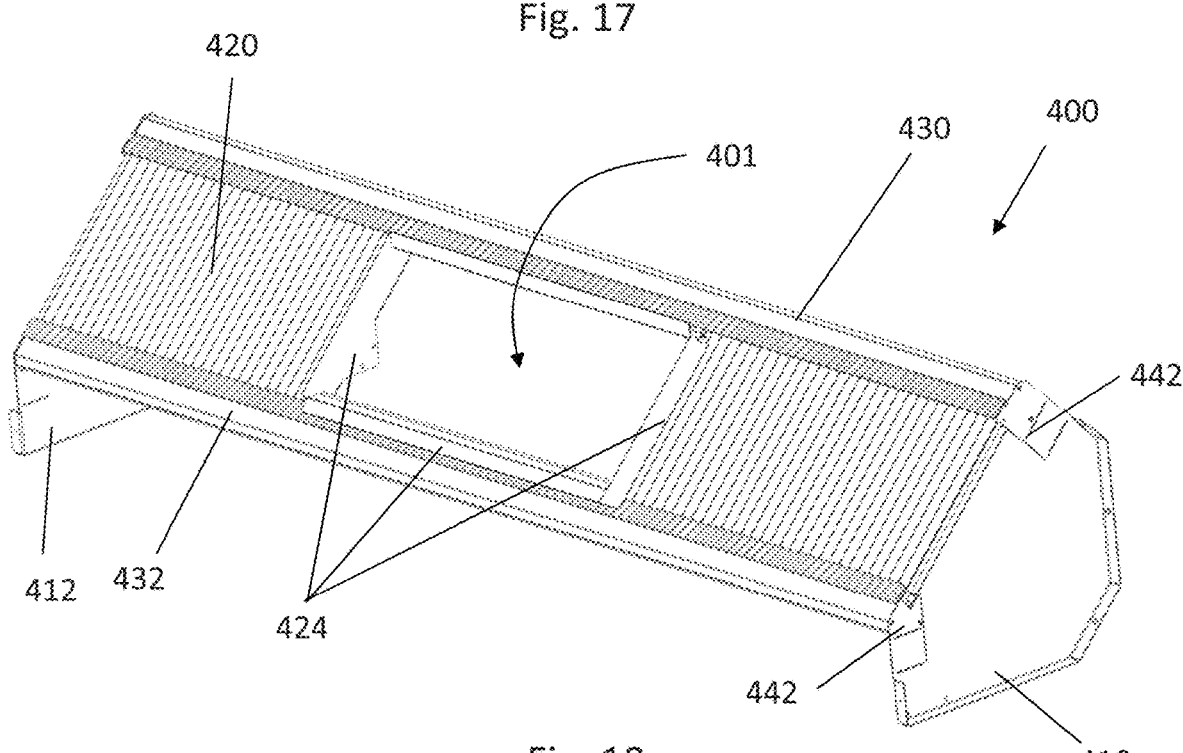
FIG. 18 shows the protective housing of FIG. 17 in isolation.

As will be understood, it is common for CMMs to be provided with one or more protective housings (covers) to protect various parts of the CMM from external contamination and objects. Turning now to FIGS. 17 and 18, there is shown an example of such a type of protective housing (cover) 400 configured to protect the linear motor 200 of the CMM's y-axis and also the above mentioned second air bearing arrangement (comprising the air bearing pads 252, and the respective bearing surfaces on the second raised rail 114). This protective housing (cover) 400 will be described in more detail in connection with FIGS. 17 to 20.

The protective housing 400 together with the structure of the CMM 100, in particular the structure of the second raised rail 114 define an internal volume 402 within which the linear motor 200 and the air bearing pads 252 (and their respective bearing surfaces) of the second air bearing arrangement are located and protected from contamination and objects located in the external operating environment 404.

Figure 19:
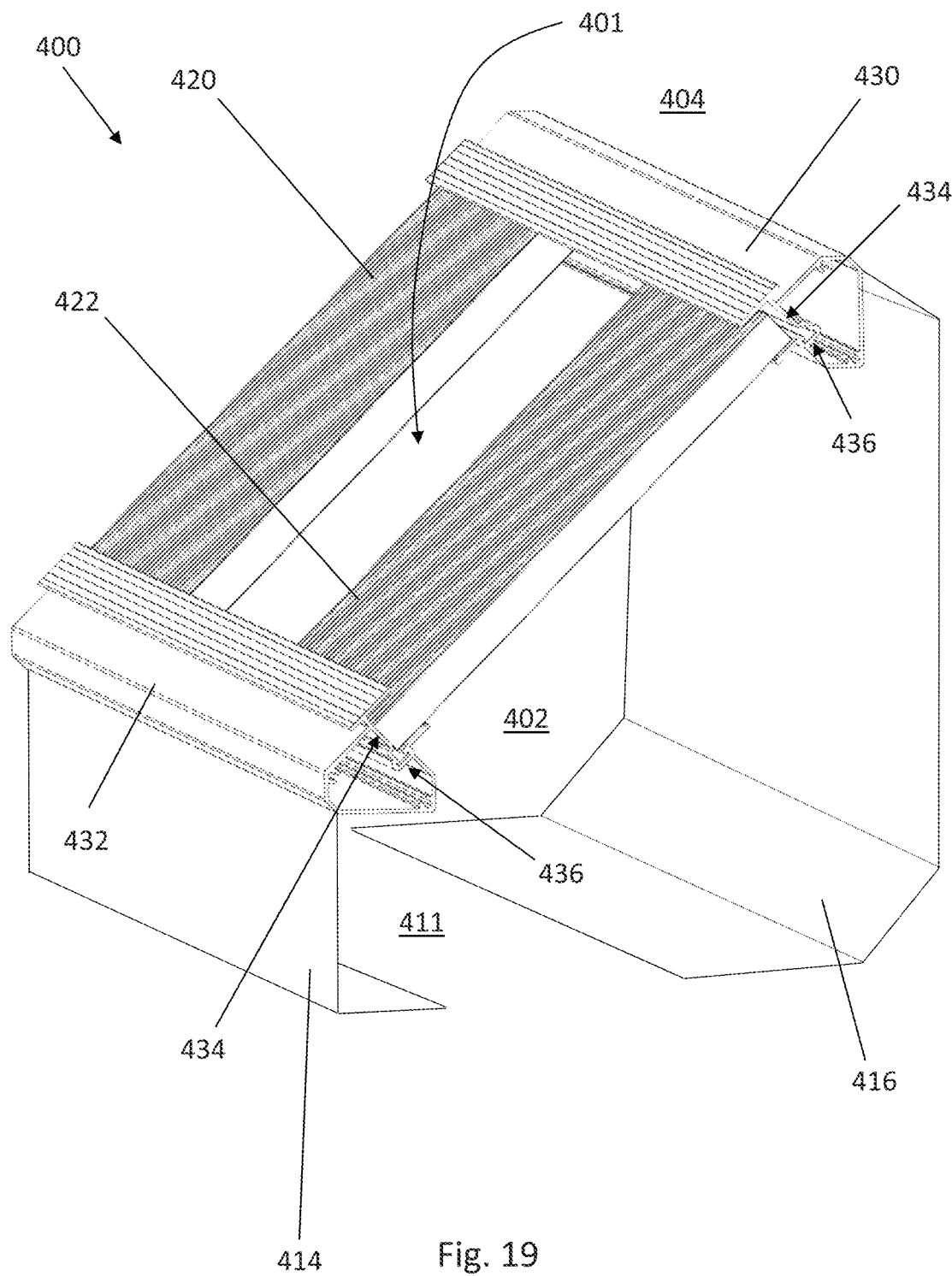
FIG. 19 shows a cut-away view of the protective housing of the cover of FIGS. 17 and 18.

The protective housing 400 comprises first 410 and second 412 end plates, and front 414 and back plates 416 (which in this case are folded to provide multiple facets as shown in FIG. 19, and is configured to be received over and capture the second raised rail 114. The first 410 and second 412 end plates are secured to the second raised rail 114 by fasteners (e.g. mechanical fasteners such as screws) to hold it in place. An elongate opening 401 in the protective housing 400 is provided such that the cross-beam 106 can extend into the protective housing and such that its bearing pads can cooperate with the second raised rail 114 to facilitate guided relative motion with the second raised rail. The protective housing 400 further comprises a retractable dust cover in the form of first 420 and second 422 bellows. A bellows frame 424 is provided for attaching the bellows to the cross-beam 106 such that they expand and contract with movement of the beam 106. Upper 430 and lower 432 bellows tracks (in the form of channels) are provided, in which the upper and lower sides of the bellows 420, 422 are received, such that they are guided as they expand and contract with movement of the beam 106.

The first 420 and second 422 bellows expand and collapse/fold with movement of the cross-beam 106 along the y-axis. In particular, the cross-beam 106 is connected to the frame 424 which slides with the cross-beam 106 so as to push and pull the first 420 and second 422 bellows as the cross-beam 106 moves back and forth along the y-axis. As shown in more detail in FIGS. 19 and 20, the first 420 and second 422 bellows sit within and are guided by the first 430 and second 432 bellows tracks. In particular, each of the upper 430 and lower 432 bellows tracks comprise a channel 434 within which the upper and lower sides/edges of the first 430 and second 432 bellows sit and can slide.

Figure 20:
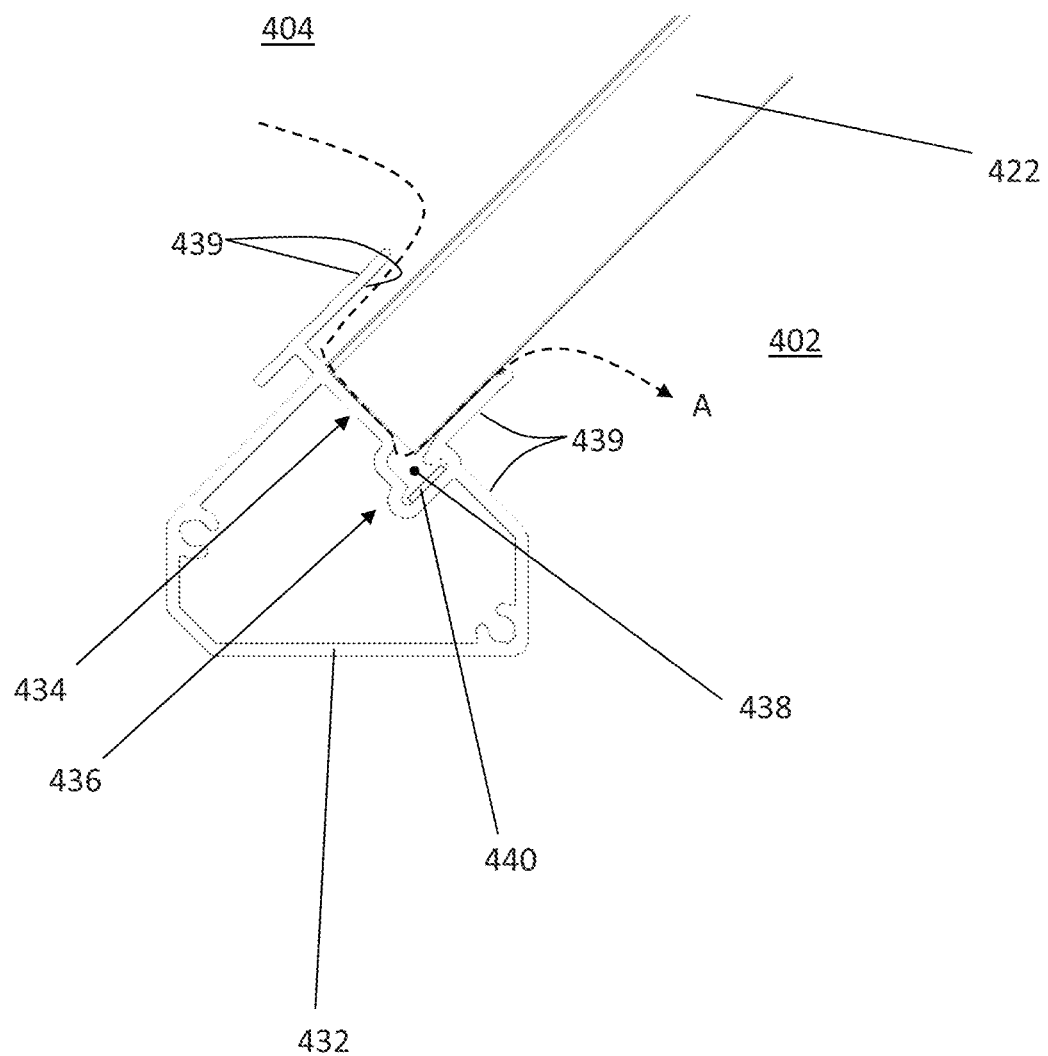
FIG. 20 shows a partial cross-sectional view of the protective housing of FIGS. 17 to 19.

As shown in FIGS. 19 and 20, each channel 434 comprises a contamination trap 436. As most clearly shown in FIG. 20, the contamination trap 436 comprises a (i.e. secondary) groove 438 which runs along the length of the (i.e. primary) channel 434 in which dirt can collect away from the bellows 422. Also, an elongate magnetic strip 440 can be located within the groove 438, this can attract and hold ferromagnetic contamination/dirt trying to enter the internal volume 402 defined by the protective housing 400. As is also shown in FIGS. 19 and 20, the groove 438 has a restricted opening, (in other words, its mouth/opening to the main void is narrower than the void).

As will be understood, the protective housing 400 does not provide a hermetic seal between the internal volume 402 defined by the protective housing 400 and the CMM's external operating environment 404. Accordingly, there will be some flow of air between the internal volume 402 and the CMM's external operating environment 404. In particular, due to the movement of the first 420 and second 422 bellows along the channels 434, there can be "leakage" between the internal volume 402 and the CMM's external operating environment 404, for instance around the sides of the bellows 420, 422 as illustrated by dashed arrow A in FIG. 20. Dirt and contamination can be entrained in such a flow of air. Our inventors have found that providing a trap, such as a groove 438, can help to reduce the amount of such entrained dirt and contamination entering the internal volume 402. This can be beneficial in maintaining the performance, reliability and/or lifespan of the CMM 100, such as the air bearings and motors located in the internal volume 402. In particular, providing a magnet 440 in the groove can help to attract, remove and retain ferromagnetic contamination or dirt present in the air flow A. This has been found to be particularly useful in embodiments in which the motor comprises a linear motor 200 (which typically comprise plurality of strong, exposed magnets). Such a ferromagnetic trap 436 helps to reduce the amount of ferromagnetic contamination reaching the motor linear 200 which would affect the performance and lifespan of the linear motor 200.

As will be understood, in other embodiments a plurality of (e.g. non-elongate) magnets could be placed in the groove 438, rather than one elongate strip. Furthermore, the magnet (s) need not be located in a groove. For example, one or more magnets could be located adjacent the channel 434 (e.g. on any of the surfaces identified by reference numeral 439) and would attract and retain at least some of the ferromagnetic material entrained in the air flow along A. However, the provision of a groove can help to trap any contamination and dirt, and also helps to keep such contamination and dirt away from other parts of the CMM, including the first 420 and second bellows 422 (the sliding of which would otherwise be affected by the collection of contamination and dirt in the channels 434).

The elongate magnetic strip 440 could be removable. For example, it could just rest in the groove 438 and/or be held by releasable means, such as a releasable (e.g. mechanical) fastener and could be accessible for removal via end caps 442 provided on the end plates 410. When opened/removed, such end caps 424 can help to facilitate cleaning and/or replacement of the elongate magnetic strip 440 (by enabling them to be slid out of the groove), and/or cleaning of the groove 438.

This concept of providing a contamination trap is described above in connection with the CMM's y-axis. As will be understood, the same or a similar arrangement can be used for the x and/or z axes.

As is normal on a positioning apparatus such as CMM 100, an energy conduit (or "energy chain") exists between the moveable members of the apparatus which comprises the necessary wires and pipes such that electrical power, signals and/or fluid (such as air for air bearings), can be delivered to and/or from the moveable member (and/or downstream members, instruments and the like, such as articulated probe heads and probes).

Figure 21:
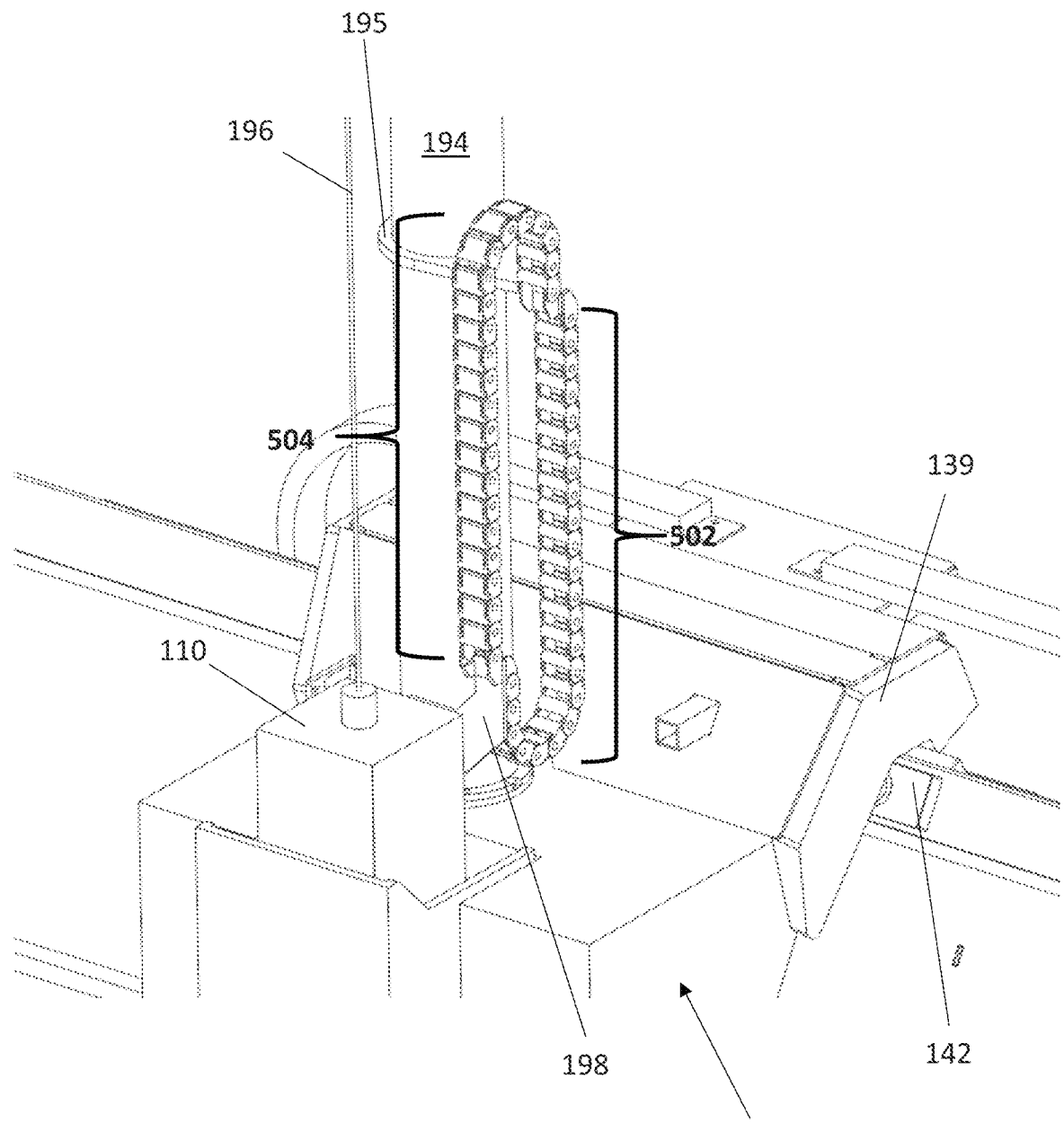
FIG. 21 shows the energy chain arrangement for the z-axis of the CMM of FIG. 1.
Figure 22:
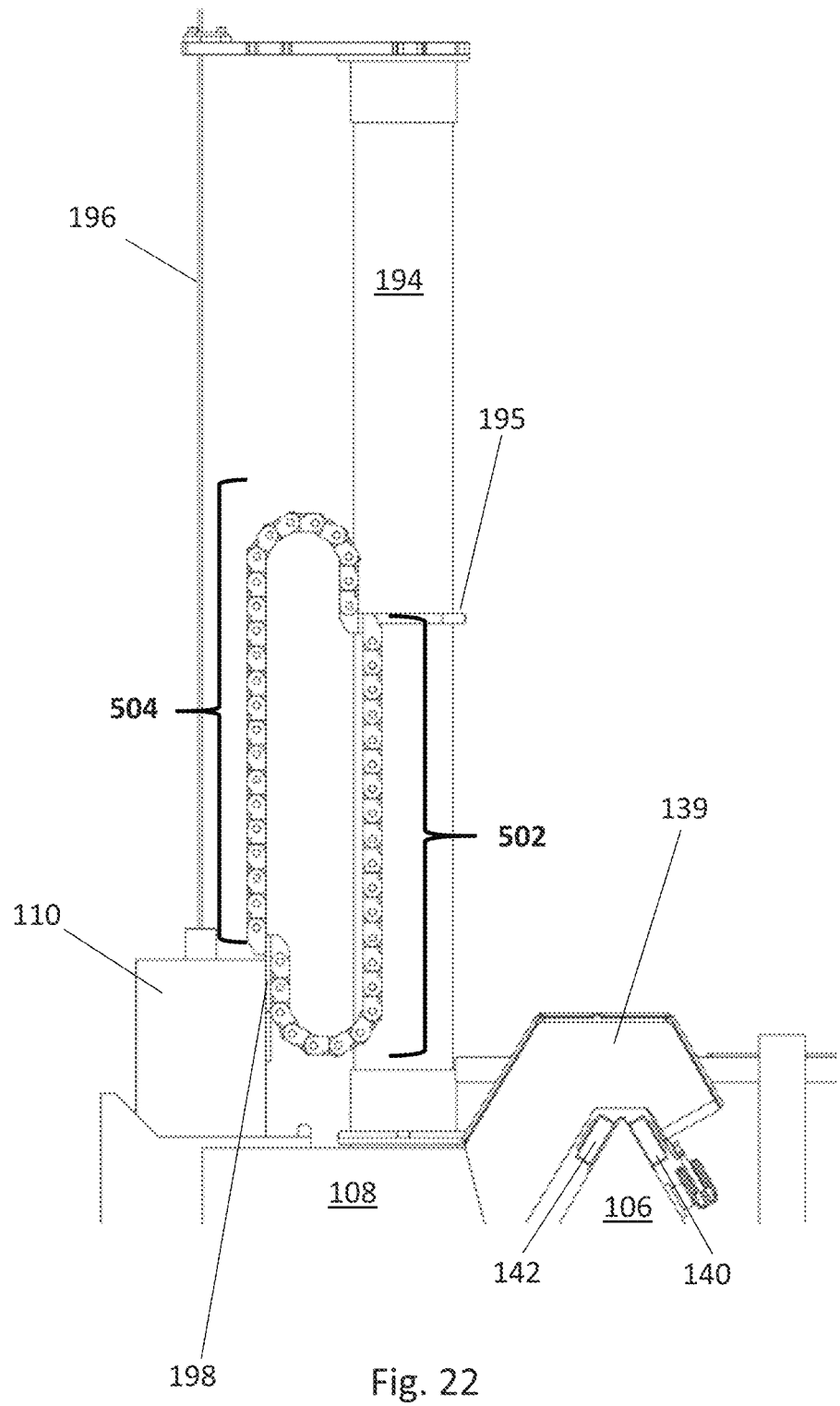
FIG. 22 shows a side view of the energy chain arrangement of FIG. 21 with the quill at a lowered position.
Figure 23:
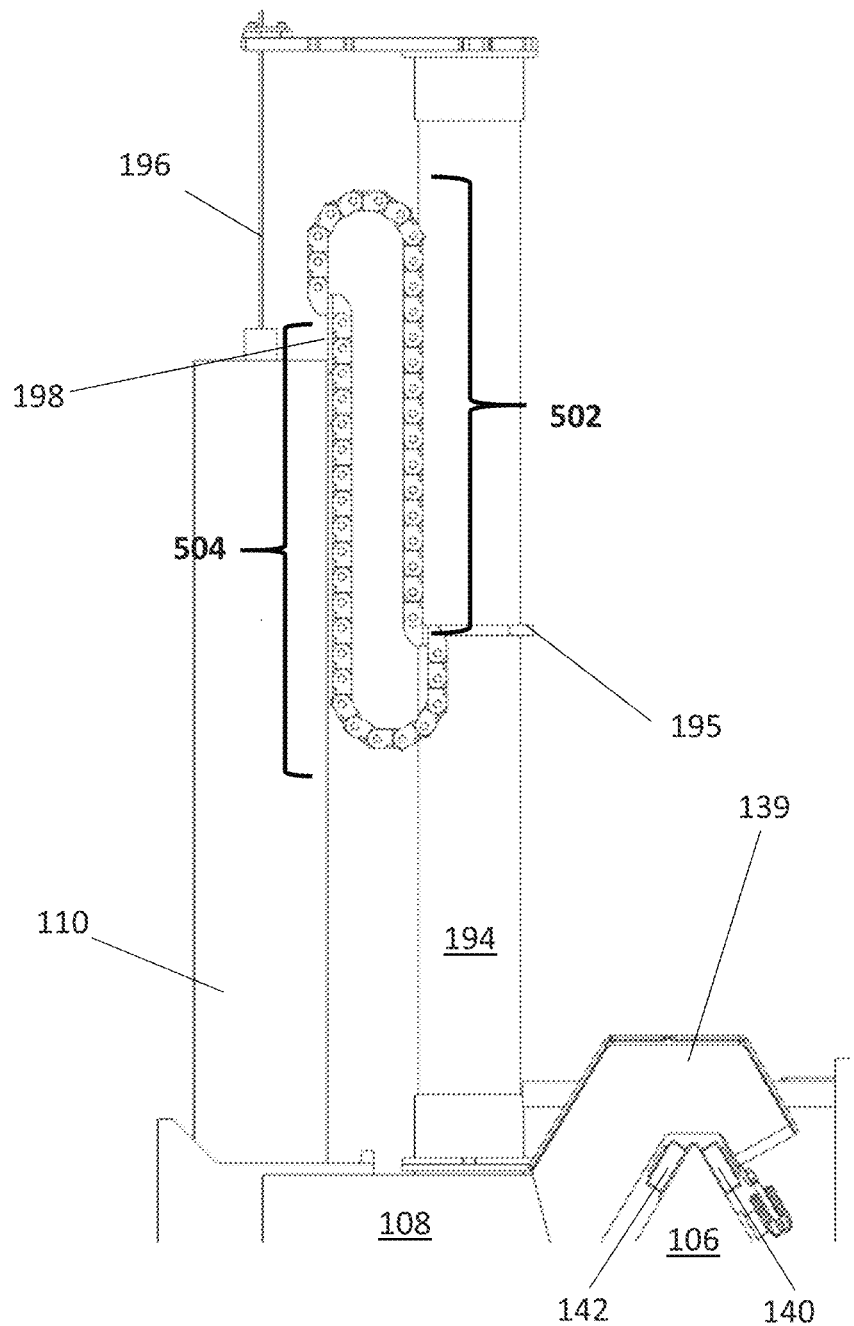
FIG. 23 shows a side view of the energy chain arrangement of FIG. 21 with the quill at a raised position.

With particular reference to FIGS. 21 to 23, in the present embodiment, two energy conduits (first 502 and second 504 energy conduits) are provided between the quill 110 and the carriage 108 which each comprise one or more electrical wires for providing power and communications to and/or from the quill 110, the articulated probe head 116, and the probe 102. The first 502 and second 504 energy conduits can also comprise one or more pipes for supplying air to the quill's air bearings (not shown). In the embodiment described, each of the first 502 and second 504 energy chains comprise a support track which flexes with relative movement of the quill 110 and carriage 108. The support tracks are configured to keep the wires and pipes associated with it tidy and to control how they flex with the relative movement of the quill 110 and carriage 108. A first end of each support track of the first 502 and second 504 energy chains is connected to the carriage 108 (in this case to the carriage's counterbalance tower 194, via bracket 195), and a second end of each support track of the first 502 and second 504 energy chains is connected to the quill 110 (in this case via a bracket 198).

Providing two energy chains between the relatively moveable members (e.g. between the quill 110 and the carriage 108) means that they can be configured such that the load they each impart on the relatively moveable members varies inversely to each other. For example, our inventors found that providing just a single energy chain (e.g. first energy chain 502) meant that the load imparted on the quill 110 varied depending on the position of the quill 110 relative to the carriage 108. This is because the energy chain itself imparts a load on the quill 110 and carriage 108. For example, in the embodiment described the load caused by the weight of the first energy chain 502 shifts from being predominately carried by the carriage 108 when the quill 110 is at a vertically low position (see FIGS. 21 and 22) to being predominately carried by the quill 110 when the quill 110 is at a vertically high position (see FIG. 23). Such varying load can have an adverse effect on the metrology of the CMM 100. In particular, our inventors found that the quill's motor had to work harder at increased heights of the quill 110. In particular, because the motor of this embodiment is a direct drive motor (and in particular a linear motor), it was found that a significantly varying amount of heat was produced by the motor dependent on the position of the quill 110. As will be understood, the structure of the apparatus can change depending on its temperature and therefore a varying heat source such as the motor can lead to poorer than desired meteorological performance.

Our inventors found that this effect can be reduced, and even avoided, by providing a compensatory member which is configured to apply a load that varies dependent on the relative position of the quill 110 and the carriage 108, so as to at least partially counteract the change in load applied by the first energy conduit 502 (that is dependent on the relative position of the quill 110 and the carriage 108). In the embodiment described, the compensatory member comprises the second energy conduit 504 which is connected to the quill 110 and carriage 108 in a manner such that the loads they impart on the quill 110 and carriage 108 vary substantially equally and oppositely. Accordingly, the first 502 and second 504 energy conduits could be described as being "balanced". In the embodiment described, this is achieved by ensuring that the first 502 and second 504 energy conduits are substantially identical, at least between the members they are connected. For example, the articulated support tracks of the first 502 and second 504 energy conduits are substantially identical in configuration, and the mass of the wires and/or pipes are evenly split between the first 502 and second 504 energy conduits. As will be understood, benefit can still be obtained even if the load imparted by the compensatory member does not vary substantially equally and oppositely, but it can be preferred that the load it imparts does vary substantially equally and oppositely.

As will be understood, other arrangements are possible. For example, rather than substantially equally sharing the wires and pipes between the first 502 and second 504 energy conduits, they could be shared in a substantially non-equal way. Furthermore, it might be that the second energy conduit is a "dummy" energy conduit in that it does not carry/guide any wires or pipes. Accordingly, the support track of the dummy second energy conduit might be provided merely as a compensatory member. In this case the support track of the dummy second energy conduit could be configured differently to the support track of the first energy conduit such that the load the support track of the dummy second energy conduit imparts on the members is substantially equal and opposite to that of the first energy conduit (which comprises the track and the wires and pipes). For example, the mass of the support track of the dummy second energy conduit 504 can be greater than that of the support track of the first energy conduit 502 to compensate for the mass of (and resistance provided by) the wires and pipes of the first energy chain 502.

In the embodiment described, the support track of each of the first 502 and second 504 energy conduits comprises a chain-like arrangement of pivotally connected links, but this need not necessarily be the case. For example, the support tracks of the first 502 and second 504 energy conduits could comprise a continuous ribbon-like band of material which bends with the relative movement of the quill 110 and carriage 108. Optionally, no support tracks are provided and the wires and pipes could for example be tied together to keep them tidy. In this case, in accordance with this embodiment of the invention the wires and pipes could be split into first and second bunches and tied together to provide the first 502 and second 504 energy chains. Accordingly, in this case the second bunch could be considered to be the compensatory member, for example.

Figure 24:
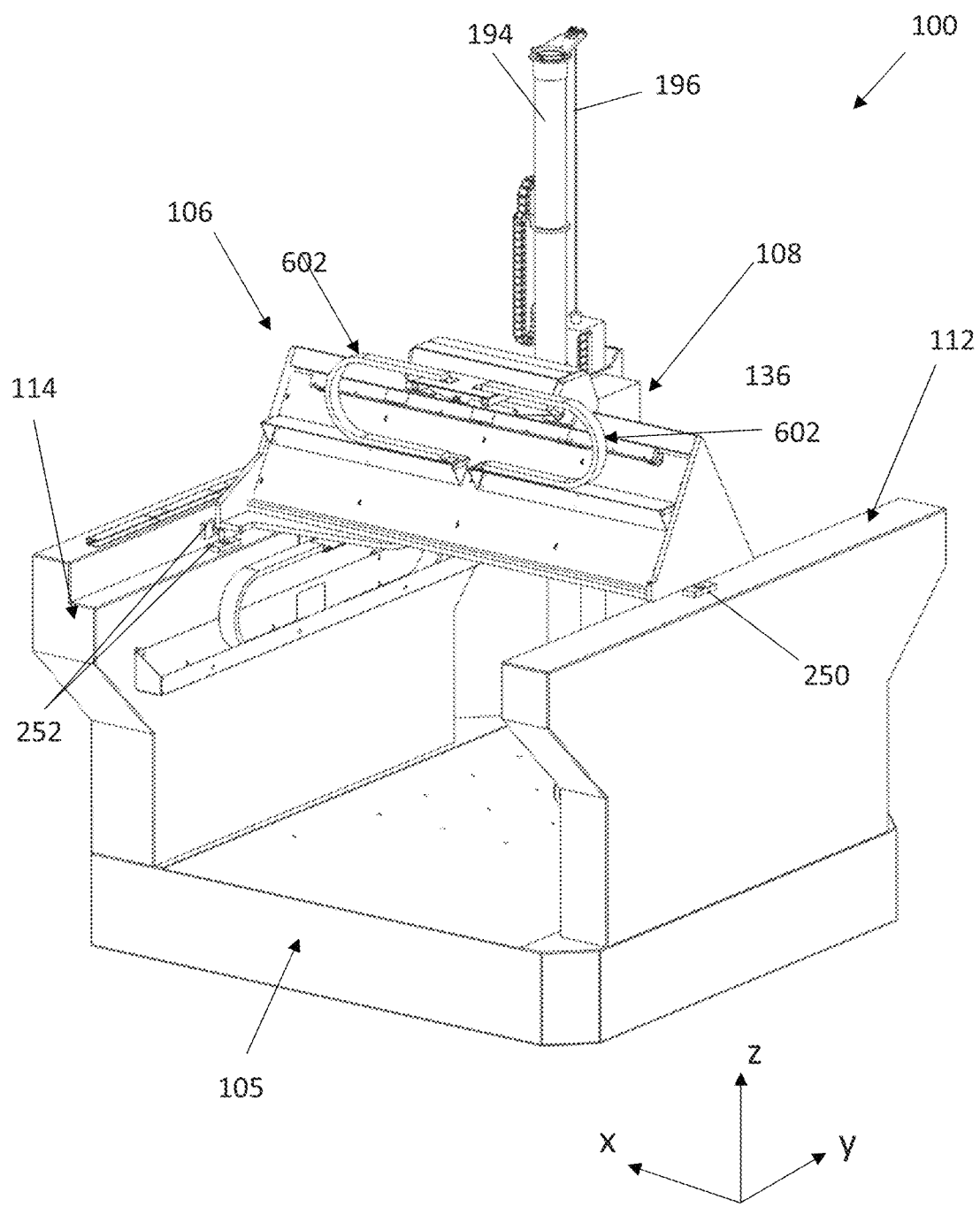
FIG. 24 is a schematic isometric view of the rear of the CMM of FIG. 1.

The concept of having a compensatory member which is configured to apply a load that varies dependent on the relative position of the moveable members of the CMM so as to at least so as to at least partially counteract the change in load applied by an energy conduit has been described above in connection with the quill 110 and carriage 108. This is because the effect of the varying load is most pronounced due to the shift in weight carried between the quill 110 and carriage 108 due to the relative vertical motion. However, the concept of having such a compensatory member has also been found to be beneficial for the other axes of the CMM too, which provide for horizontal relative motion (and so are not subject to varying weight loads in the direction of motion), since the back-driving force applied by an energy conduit to a relatively moveable member can vary depending on the position of the moveable member along the axis. For example, such an arrangement of two substantially balanced energy conduits between horizontally moveable members can be seen in FIG. 24 where first 602 and second 604 energy conduits are provided between the beam 106 and the carriage 108. As with the first 502 and second 504 energy conduits between the carriage 108 and quill 110, the first 602 and second 604 energy conduits between the beam 106 and carriage 108 comprise one or more electrical wires and one or more pipes. Also, as with the first 502 and second 504 energy conduits between the carriage 108 and quill 110, the first 602 and second 604 energy conduits between the beam 106 and carriage 108 are configured such that the load they impart on their members (e.g. the carriage 108) varies substantially equally and oppositely with the relative movement of the carriage 108 along the beam 106. However, unlike the first 502 and second 504 energy conduits between the carriage 108 and quill 110, the first 602 and second 604 energy conduits comprise continuous ribbon-like bands of material which bend with the relative movement of the carriage 108 and beam 106 so as to guide the wires and pipes (rather than comprising a chain-like arrangement of pivotally connected links).

Providing a compensatory member can help to reduce or even avoid any change in the resultant load caused by the back-driving force. This is particularly advantageous where a direct drive motor (such as a linear motor) is used to effect the relative movement due to the above described heat dissipation issues which direct drive motors (e.g. linear motors) are particularly sensitive to. In particular, ensuring that the compensatory member substantially balances the force applied by the first energy chain (e.g. such that the resultant load applied to the moveable member by the energy chain and compensatory member is not more than 5 Newtons (N), and optionally not more than 4 N, for example not more than 3 N, for instance not more than 2 N or even not more than 1 N along at least 75%, optionally along at least 90% of its moveable extent along the axis) can ensure that heat dissipated by the motor is not excessive. Furthermore, providing a compensatory member which provides a force to the moveable member which varies inversely to that provided by the first energy chain such that the change in resultant load applied to the moveable member by the energy chain and compensatory member is not greater than 3 N, optionally not more than 2 N, and for example not more than 1 N along at least 75%, optionally along at least 90%, of its moveable extent can ensure that variations in heat dissipated by the motor along the axis is kept within a reasonable level.

In the embodiments described, the bearing assembly comprises an air bearing. However, as will be understood, the invention is also applicable to non-air bearing assemblies. For example, mechanical bearings, such as ball race bearings, could be used.

As will be understood, the invention and design principles thereof is also applicable to other parts of the CMM 100 (e.g. to the quill 110), and also to other types of CMM, including bridge, column, horizontal arm and cantilevered CMMs (as a non-exhaustive list). The invention is also not limited to CMMs, but is applicable to other positioning apparatus including machine tools.

The invention claimed is:

1. A coordinate positioning apparatus for inspecting an artefact, comprising at least one moveable member moveable in at least one degree of freedom, and at least one motor and at least one bearing arrangement for facilitating said movement, at least a part of the at least one motor and/or at least one bearing arrangement being located inside a protective housing therefor, and in which a ferromagnetic contamination trap comprising at least one magnet is provided and configured to attract and retain ferromagnetic contamination entering the protective housing.

2. A coordinate positioning apparatus as claimed in claim 1, in which the at least one magnet comprises an elongate strip magnet that extends at least partially along the extent of movement of the at least one moveable member.

3. A coordinate positioning apparatus as claimed in claim 1, in which the at least one magnet is releasably retained to the coordinate positioning apparatus.

4. A coordinate positioning apparatus as claimed in claim 1, in which the at least one magnet is located proximal to, and extends at least partially along the extent of, an opening in the protective housing.

5. A coordinate positioning apparatus as claimed in claim 1, in which the at least one magnet is located between the at least one motor and/or the at least one bearing arrangement located inside the protective housing and an opening in the protective housing.

6. A coordinate positioning apparatus as claimed in claim 4, in which the protective housing is provided by another member of the coordinate positioning apparatus, and in which the at least one moveable member can cooperate with, and move relative to, the other member of the coordinate positioning apparatus through the opening in the protective housing.

7. A coordinate positioning apparatus, as claimed in claim 6, comprising a compliant cover which extends at least partially over the opening in the protective housing and which is configured to deform and/or move so as to facilitate movement of the at least one moveable member, whilst restricting the passage of contamination through the opening into the protective housing.

8. A coordinate positioning apparatus a claimed in claim 7, in which a part of the moveable cover is received within a track for guiding the movement of the moveable cover.

9. A coordinate positioning apparatus as claimed in claim 1, in which the at least one magnet is located in a groove.

10. A coordinate positioning apparatus as claimed in claim 8, in which the track comprises the groove, the groove extending along the track and configured such that dirt and contamination can collect away from the moveable cover.

11. A coordinate positioning apparatus as claimed in claim 1, in which the motor comprises a linear motor.

12. A coordinate positioning apparatus as claimed in claim 1, in which the coordinate positioning apparatus is a Cartesian coordinate measuring machine.

13. A coordinate positioning apparatus, comprising a plurality of moveable members for effecting relative movement of a tool relative to a workpiece, the coordinate positioning apparatus comprising a moveable cover which moves with a moveable member of the coordinate positioning apparatus, a part of the moveable cover being received within a track for guiding the movement of the moveable cover, and the track comprising a groove which extends along the length of the track in which dirt and contamination can collect away from the moveable cover.

14. A coordinate positioning apparatus as claimed in claim 13, comprising at least one magnet located in the groove for attracting ferromagnetic material.

15. A coordinate positioning apparatus as claimed in claim 13, in which said moveable cover comprises a retractable cover, and in which said track comprises a retractable cover track.

* * * * *